US012700557B2

(12) United States Patent
Fruehling et al.

(10) Patent No.: US 12,700,557 B2
(45) Date of Patent: Aug. 4, 2026

(54) ELECTROMECHANICAL SWITCH

(71) Applicant: TEXAS INSTRUMENTS INCORPORATED, Dallas, TX (US)

(72) Inventors: Adam Fruehling, Garland, TX (US); Scott Summerfelt, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 463 days.

(21) Appl. No.: 18/169,013

(22) Filed: Feb. 14, 2023

(65) Prior Publication Data

US 2024/0274387 A1 Aug. 15, 2024

(51) Int. Cl.
*H01H 59/00* (2006.01)

(52) U.S. Cl.
CPC .................................. *H01H 59/00* (2013.01)

(58) Field of Classification Search
CPC ........... H01H 59/00; H01H 2001/0078; H01H 2001/0084; H01H 1/50; H01H 2059/0063; H01H 59/0009; H02N 1/008
USPC .......................................................... 361/211
See application file for complete search history.

(56) References Cited

U.S. PATENT DOCUMENTS 6,753,488 B2 6/2004 Ono
8,570,122 B1 * 10/2013 Hammond ............ B81B 7/0019 335/78
8,826,529 B2 * 9/2014 Detor ..................... C25D 5/022 29/829
9,117,610 B2 * 8/2015 Aimi ........................ B81B 7/008
9,166,271 B2 10/2015 Peroulis
2002/0127760 A1 9/2002 Yeh
2010/0068854 A1 * 3/2010 Schirmer ............. H01H 1/0036 257/E21.505

(Continued)

FOREIGN PATENT DOCUMENTS

EP 4057317 A1 * 9/2022 ......... H01H 59/0009
EP 4075469 A1 * 10/2022 ............... B81B 7/02
KR 20220153601 A * 11/2022 ........... B81B 7/0041

OTHER PUBLICATIONS

Minnick Andrew; Title: MEMS Devices built on substrates with Ruthenium-based contact surface materials; Entire specification and drawings (Year: 2022).*

(Continued)

*Primary Examiner* — Dharti H Patel
(74) *Attorney, Agent, or Firm* — Zhenhai Fu; Frank D. Cimino

(57) ABSTRACT

An apparatus includes a semiconductor structure having a cavity, a first terminal on a first cavity side, and a second terminal on a second cavity side. The second terminal includes an extension that overlaps part of the cavity. The extension includes a first contact. The apparatus includes a bendable beam extending from the first cavity side and includes a metal layer coupled to the first terminal. The beam has opposite first and second beam sides. The first beam side couples to the first terminal, and the second beam side faces the second cavity side. The beam includes a second contact that overlaps at least a portion of the extension and faces the first contact. An actuator is configured to bend the bendable beam around a first axis, and bend the bendable beam around a second axis orthogonal to the first axis by moving the second beam side against the extension.

21 Claims, 32 Drawing Sheets

(56) References Cited

U.S. PATENT DOCUMENTS

| | | | | |
|---|---|---|---|---|
| 2010/0155204 | A1 | 6/2010 | Receveur | |
| 2010/0156577 | A1 | 6/2010 | Wang | |
| 2011/0063068 | A1* | 3/2011 | Zhang | F03G 7/005 337/35 |
| 2011/0163397 | A1* | 7/2011 | Detor | H01H 59/0009 438/52 |
| 2011/0308924 | A1 | 12/2011 | Kishore | |
| 2012/0175230 | A1 | 7/2012 | Hammond | |
| 2012/0305373 | A1* | 12/2012 | Sun | H01H 1/0036 200/181 |
| 2015/0311003 | A1* | 10/2015 | Fitzgerald | H01H 59/0009 200/181 |
| 2016/0257558 | A1* | 9/2016 | Aimi | B81B 3/0072 |
| 2021/0215928 | A1 | 7/2021 | Fruehling | |
| 2023/0068451 | A1* | 3/2023 | Bahr | H01H 37/64 |
| 2024/0150166 | A1 | 5/2024 | Raab | |
| 2024/0274388 | A1* | 8/2024 | Fruehling | H01H 59/0009 |

OTHER PUBLICATIONS

A Closed-Form Model For the Pull-In Voltage of Elecrostatically Acuated Cantilever Beams, S. Chowdhury, et al., J. Micromech. Microeng. 15 765, Published Feb. 14, 2005, p. 756-763.

Chowdhury et al., "A closed-form model for the pull-in voltage of electrostatically actuated cantilever beams", Journal of Micromechanics and Microengineering, Feb. 14, 2005, pp. 756-763, vol. 15, No. 4.

Krylov, Slava et al., Bistability of curved microbeams actuated by fringing electrostatic fields, Nonlinear dynamics, Apr. 20, 2011, vol. 66, pp. 403-426. pp. 405-407 and figures 2-3.

Mousavi, Mohammad et al., Electrostatic levitation: an elegant method to control MEMS switching operation, Nonlinear dynamics, May 12, 2021, vol. 104, pp. 3139-3155. pp. 3139-3142 and figures 1-4.

* cited by examiner

ELECTROMECHANICAL SWITCH

RELATED APPLICATION

The present application is related to U.S. patent application Ser. No. 18/168,959, titled "Electromechanical Switch", filed on Feb. 14, 2023, which is hereby incorporated herein by reference in its entirety.

BACKGROUND

A switch can be closed or opened to, respectively, electrically connect or disconnect between two terminals. One example of a switch is an electromechanical switch, such as a relay device, which includes a pair of electrical contacts each coupled to a respective terminal. An electromechanical switch can include an actuator. Responsive to an electrical signal (e.g., a voltage signal), the actuator can bring the two electrical contacts into physical contact and close the switch, or can separate the two electrical contacts from each other to open the switch. The actuator works by electrostatic forces where a voltage difference between two metal regions creates a force between those regions. The velocity by which the actuator brings the two electrical contacts into physical contact can impact the stability and reliability of the switch. Also, the holding force applied by the actuator onto the two electrical contacts after physical contact is made can affect the electrical resistance between the two electrical contacts.

SUMMARY

In at least one example, an apparatus includes a semiconductor structure having a cavity, a first terminal on a first cavity side, and a second terminal on a second cavity side. The second terminal includes an extension that overlaps part of the cavity. The extension includes a first electrical contact. The apparatus includes a bendable beam extending from the first cavity side and includes a metal layer coupled to the first terminal. The beam has opposite first and second beam sides. The first beam side couples to the first terminal, and the second beam side faces the second cavity side. The beam includes a second electrical contact that overlaps at least a portion of the extension and faces the first electrical contact. An actuator is configured to bend the bendable beam around a first axis, and bend the bendable beam around a second axis orthogonal to the first axis by moving the second beam side against the extension.

DETAILED DESCRIPTION

Figure 1:
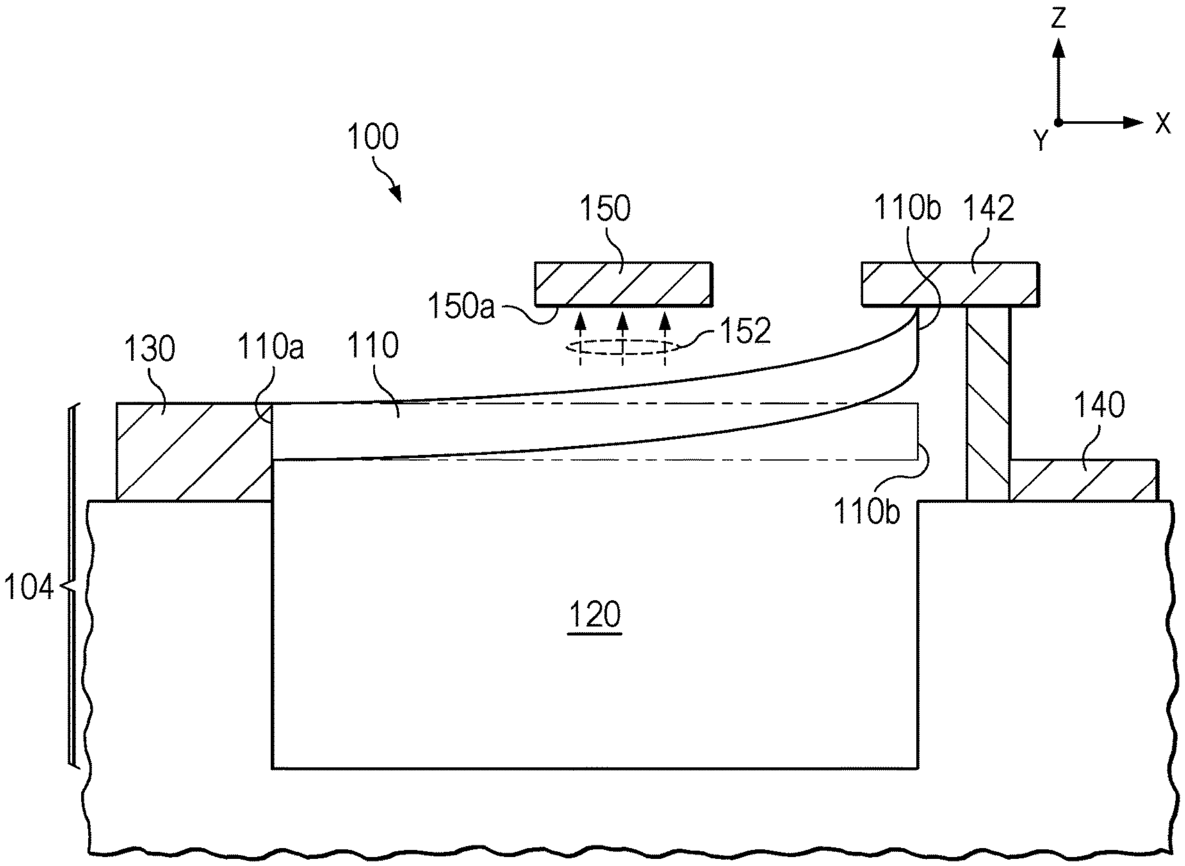
FIG. 1 is a schematic illustrating a side view of an example electromechanical switch.

The same reference numbers or other reference designators are used in the drawings to designate the same or similar (either by function and/or structure) features.

FIG. 1 is schematic illustrating a side view of an example electromechanical switch 100. In some examples, electromechanical switch 100 can be a micromechanical system (MEMS) relay including a semiconductor structure 104 having a beam 110 and a cavity 120. Beam 110 is formed in or on the semiconductor structure 104. Beam 110 may be formed in a metal layer within the semiconductor structure or may otherwise be coated with a metal layer. Beam 110 has opposing ends 110*a* and 110*b*. Beam end 110*a* is coupled to, or extends from, one side of the cavity 120. From end 110*a*, the beam 110 extends into or above cavity 120 as shown. Beam 110 is elastic and deformable/bendable.

Electromechanical switch 100 also includes electrical terminals 130 and 140 at opposing ends of the beam 110. End 110*a* of the beam is in continuous electrical connectivity with electrical terminal 130, and beam 110 can form or provide an electrical contact that extends from electrical terminal 130. Also, electromechanical switch 100 includes an electrical contact 142 that extends from electrical terminal 140.

Beam 110 is bendable to open or close electromechanical switch 100. To open electromechanical switch 100 so that current cannot flow through between terminals 130 and 140, the beam 110 can be in a first state (e.g., an unbent state) represented by the dashed outline in FIG. 1. In such a state, the opposing end 110*b* of beam 110 is not in physical contact with electrical contact 142. To close electromechanical switch 100 so that current can flow between terminals 130 and 140, beam 110 can be in a second state (e.g., a bent state), and end 110b of beam 110 can be in physical contact with electrical contact 142.

Electromechanical switch 100 also includes an actuator 150 to exert a force onto beam 110. The actuator shown here is an electrostatic actuator where the force between electrodes varies with the voltage difference between the electrodes squared. In addition, the amount of force is related to gap between the electrodes with smaller gaps creating much higher forces. With end 110a of beam 110 mechanically coupled with electrical terminal 130, the force causes beam 110 to bend from the dashed outline position to the curved position. The bending can bring end 110b of beam 110 into physical contact with electrical contact 142 to close electromechanical switch 100. When actuator 150 stops exerting the force, the elasticity of the beam 110 allows the beam to return from the curved position back to the dashed outline position representing its original state. End 110b of beam 110 can be separated from electrical contact 142, and electromechanical switch 100 can be opened.

In some examples, actuator 150 can include a planar conductor that overlaps part of a surface of beam 110 and can provide parallel plate actuation. Specifically, actuator 150 can be coupled to a voltage generator (not shown in FIG. 1), which can set a first electrical potential of actuator 150. In some examples, the electrical potential of beam 110 can be set by a voltage at electrical terminal 130. In some examples, the part of beam 110 that overlaps with actuator 150 can be insulated from electrical terminal 130, and another voltage generator can be coupled to and set a second electrical potential of the overlapped part of beam 110. Accordingly, an electrical potential difference exists between actuator 150 and beam 110. The electrical potential difference can create an electric field 152 between beam 110 and the planar surface 150a of actuator 150 facing beam 110, and the electric field 152 can generate an electrostatic force. Due to the electrostatic force, part of beam 110 proximate end 110b can move in the same direction as electric field 152, causing beam 110 to bend. As the bending of the beam 110 increases, the end 110b of beam 110 can be brought into physical contact with electrical contact 142 to close electromechanical switch 100.

Figure 2:
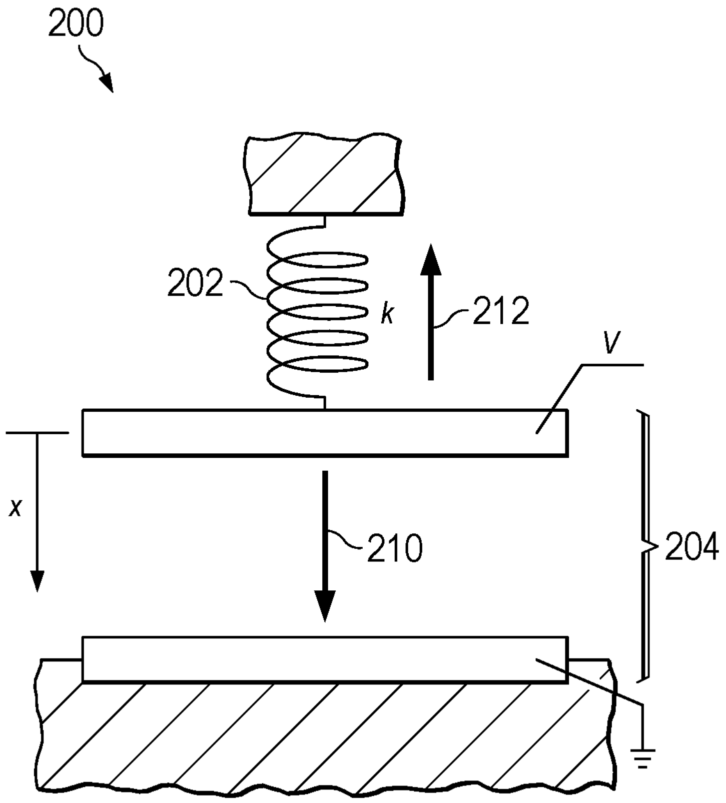
FIG. 2 is a schematic illustrating an example mechanical model of the electromechanical switch of FIG. 1. schematic illustrating example components of an electromechanical switch.
Figure 3:
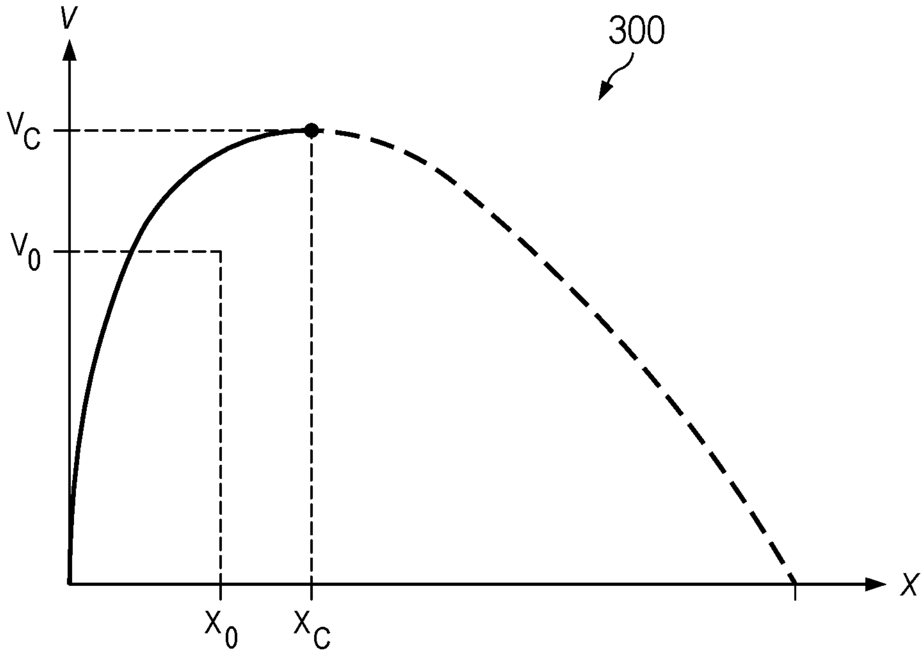
FIG. 3 and FIG. 4 are graphs illustrating example operations of the electromechanical switch of FIG. 1.

Under certain operation conditions, the parallel plate actuation in FIG. 1 can lead to instability of electromechanical switch 100 and degrade the reliability of the switch. FIG. 2 is a schematic illustrating a model 200 of electromechanical switch 100 under parallel plate actuation, and FIG. 3 illustrates a graph 300 representing various operation conditions of model 200. Referring to FIG. 2, model 200 can include a spring 202 having a spring constant K, and a parallel plate actuator 204. Spring 202 can be a mechanical model representing the elasticity of beam 110. Parallel plate actuator 204 can be an electrical model representing actuator 150 and beam 110. Parallel plate actuator 204 can have an electrical potential difference (V), which generates electric field 152 (of FIG. 1), which generates an electrostatic force 210 to bend beam 110. In model 200, the bending of beam 110 is represented by stretching/deforming of spring 202 by a displacement X. The stretching/deforming of spring 202 creates a mechanical restoring force 212 that counters electrostatic force 210. Mechanical restoring force 212 can increase linearly with the displacement X. An equilibrium state is reached when electrostatic force 210 equals mechanical restoring force 212, and beam 110 can be static and remain in a particular bent state. The electrostatic force is related to the voltage difference to the square power and to the distance between the electrodes to inverse square power. Examples of mathematical models that describe the relationships among the electrostatic force and the voltage difference and the distance are described in "A closed-form model for the pull—in voltage of electrostatically actuated cantilever beams" by S Chowdhury, M Ahmadi and WC Miller, published in Journal of Micromechanics and Microengineering, volume 15, pp. 756-763 (2005).

As the electrical potential difference across parallel plate actuator 204 increases, spring 202 is further stretched, and displacement X increases. Referring again to FIG. 1, the distance between actuator 150 and beam 110 (represented by the distance between the parallel plates of parallel plate actuator 204) decreases. The decreasing gap can accelerate the increase of the electric field 152 (of FIG. 1) between actuator 150 and beam 110, which also accelerates the increase of electrostatic force 210. As displacement X increases, mechanical restoring force 212 also increases to counter the increased electrostatic force 210, so that beam 110 can remain in the equilibrium state.

Figure 4:
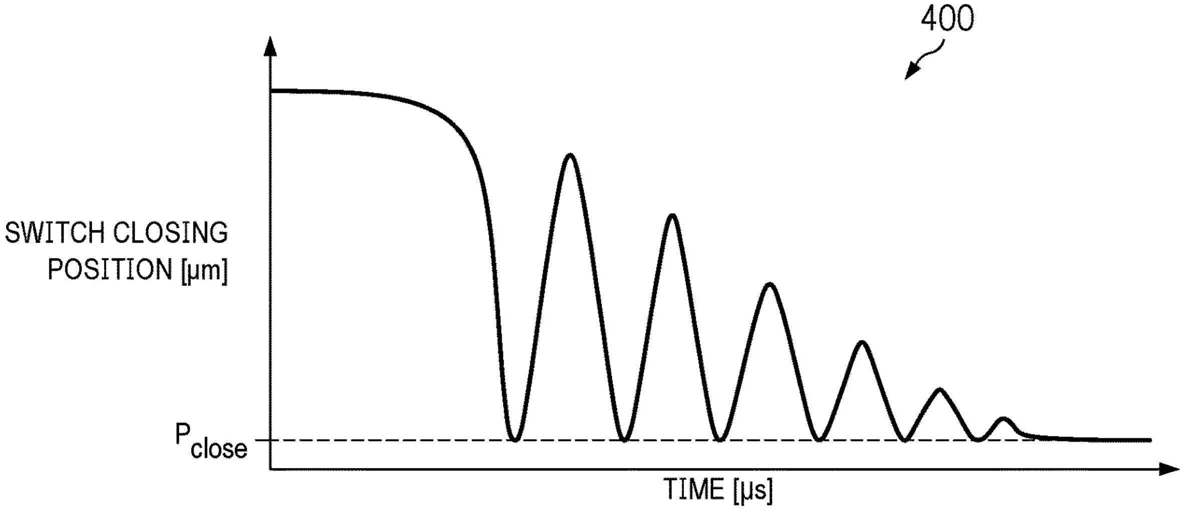

However, as the displacement X continues to increase, beam 110 can enter a critically equilibrium stable state, or a pull—in state, when the elasticity (or stiffness) of beam 110 vanishes. Graph 300 represents the various operation states of beam 110 at different electrical potential differences (V) and displacements (X). Referring to graph 300, beam 110 can be in a stable equilibrium state where the displacement X increases with the electrical potential difference V. In a stable equilibrium state, such as when V equals $V_0$, beam 110 can oscillate before its velocity reaches zero, and the stable equilibrium state is reached when the displacement of beam 110 reaches $X_0$. The oscillation can be due to the high impact velocity of beam end 110b onto electrical contact 142, which causes beam end 110b to bounce off from electrical contact 142 upon impact, and the electrostatic force can bring beam end 110b back to electrical contact 142 after the bouncing. The repeated bouncing can result in oscillation, which can stop when the energy in beam 110 fully dissipates. FIG. 4 illustrates a graph 400 of the movement of beam 110 with time as end 110b of beam 110 approaches a particular position $P_{close}$ to close the switch. Referring to graph 400, beam 110 may repeatedly bounce away from $P_{close}$ in multiple cycles, until it settles down at $P_{close}$.

As V further increases and reaches a critical voltage $V_C$, and displacement X equals $X_C$, beam 110 can enter the critically equilibrium state, or the pull—in state. As the electrical potential difference V further increases beyond $V_C$, beam 110 can enter an unstable equilibrium state. In the unstable equilibrium state, the stiffness (and the resulting mechanical restoring force) can vanish, and beam 110 may spontaneously collapse and accelerate into electrical contact 142.

The oscillation of beam 110 in the stable equilibrium state, as shown in FIG. 4, can also create instability in electromechanical switch 100. Specifically, because of the oscillation, the degree of physical contact between end 110b and electrical contact 142 varies with time, and the resistance of electromechanical switch 100 in the closed state also varies, which degrades the performance of electromechanical switch 100 as a relay. Also, the delay incurred to wait for the oscillation to stop can also increase the latency in closing of electromechanical switch 100, which can reduce the operation frequency/speed of electromechanical switch 100.

Also, operating beam 110 in the unstable equilibrium state can reduce the reliability of electromechanical switch 100. Specifically, as explained above, in the unstable equilibrium state, the stiffness (and the resulting mechanical restoring force) can vanish, and beam 110 may spontaneously collapse and accelerate into electrical contact 142. Accordingly, beam 110 may come into physical contact with electrical contact 142 at a high speed. Such arrangements can damage end 110*b* of beam 110 and/or electrical contact 142, especially if electromechanical switch 100 is opened and closed repeatedly at a high frequency over a long duration. Accordingly, the reliability of electromechanical switch 100 can be degraded, and the lifespan of electromechanical switch 100 can also be reduced.

In some examples, an electromechanical switch can be actuated by fringing field actuators. Fringing field can refer to electric fields that appear between the edges/fringes of a pair of conductors. The fringing field can create an electrostatic force, and the electrostatic force can cause the fringing field actuators to move with respect to each other along a direction different from the fringing field direction. While the fringing field strength increases as the distance between the edges/fringes of the conductors decrease, the rate of increase can be slower than parallel plate actuation, which can reduce the likelihood of oscillation as shown in FIG. 4. Also, fringing field actuators can be arranged to maintain a certain minimum distance between the pair of conductors, which can set a limit on the maximum fringing electric field and the resulting electrostatic force between the conductors. The limited electrostatic force can reduce the likelihood of operating beam 110 in the unstable equilibrium state, which can reduce the speed at which beam 110 comes into physical contact with electrical contact 142. The reduced contact speed can improve the reliability of the electromechanical switch and extend its lifespan.

Figure 5A:
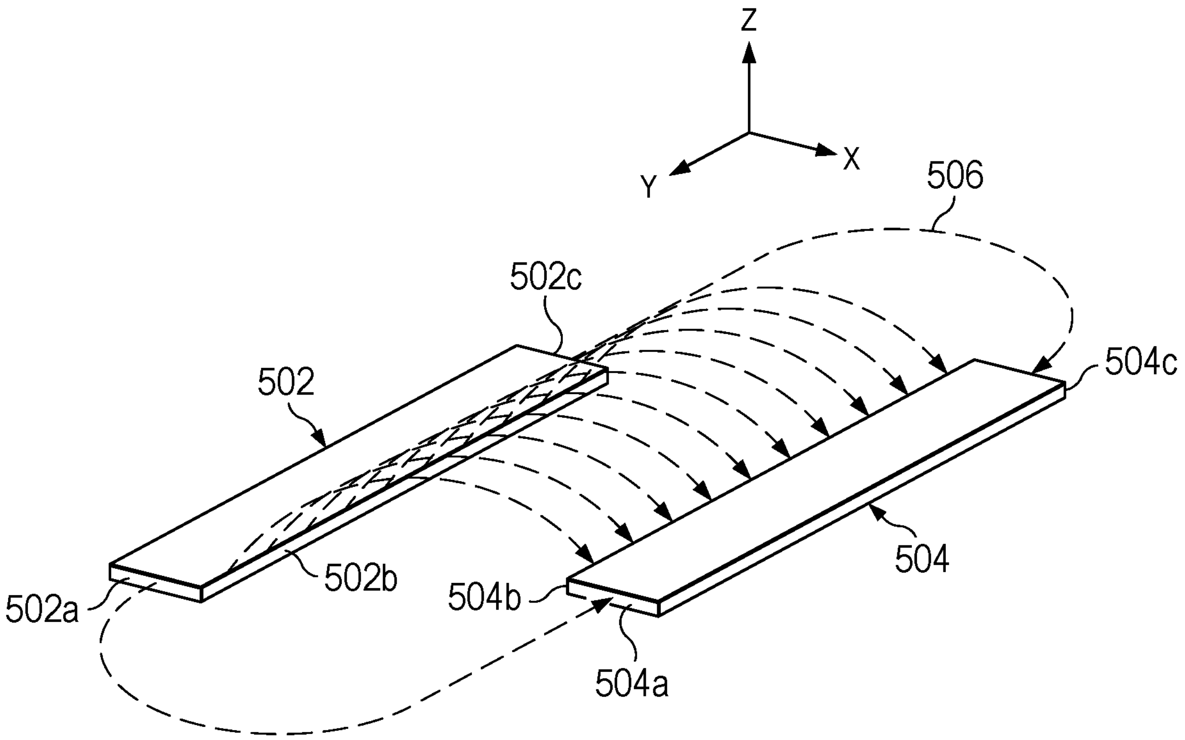
FIGS. 5A and 5B are schematics illustrating an example fringing field actuator that can be part of an electromechanical switch and its operation.
Figure 5B:
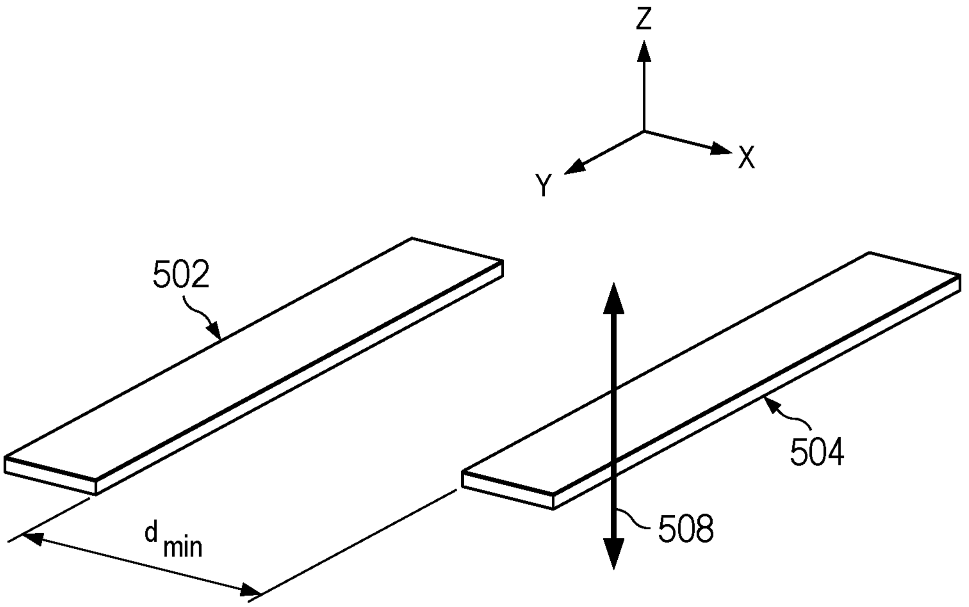

FIGS. 5A and 5B are schematics illustrating an example fringing field actuator and its operation. Referring to FIG. 5A, a pair of rectangular conductors 502 and 504 can form a fringing field actuator. Conductors 502 and 504 can each be coupled to a voltage source (not shown in the figures) to create an electrical potential difference between the conductors, which can generate fringing electric fields 506 (represented by dotted arrows) between edges/fringes of conductors 502 and 504, such as between pair of edges 502*a* and 504*a*, pair of edges 502*b* and 504*b*, and pair of edges 502*c* and 504*c*. Referring to FIG. 5B, fringing electric fields 506 can generate an electrostatic force, and the electrostatic force can cause rectangular conductors 502 and 504 to move with respect to each other along a direction 508 (e.g., along the z-axis) different from the directions of fringing electric fields 506. The strength of the fringing fields, as well as the strength of the electrostatic force, can increase as the distance between the pair of edges decrease. For example, the electrostatic force between rectangular conductors 502 and 504 can be at a maximum when the conductors have a zero distance between them along direction 508 (z axis in FIGS. 5A and 5B), and the distance between the conductors on a plane orthogonal to direction 508 (x-y plane in FIGS. 5A and 5B) can be at $d_{min}$.

Figure 6A:
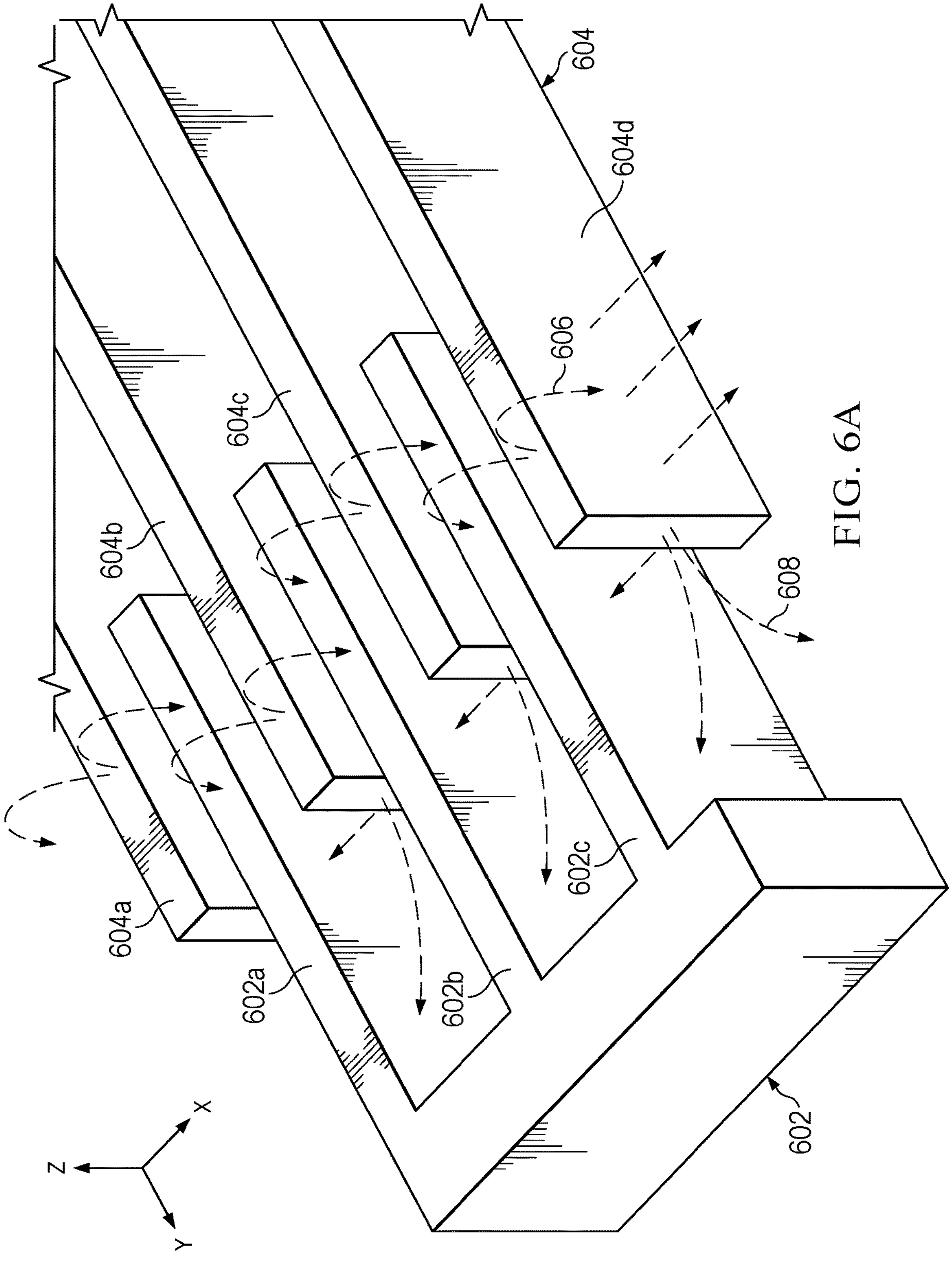
FIGS. 6A and 6B are schematics illustrating another example fringing field actuator that can be part of an electromechanical switch and its operation.
Figure 6B:
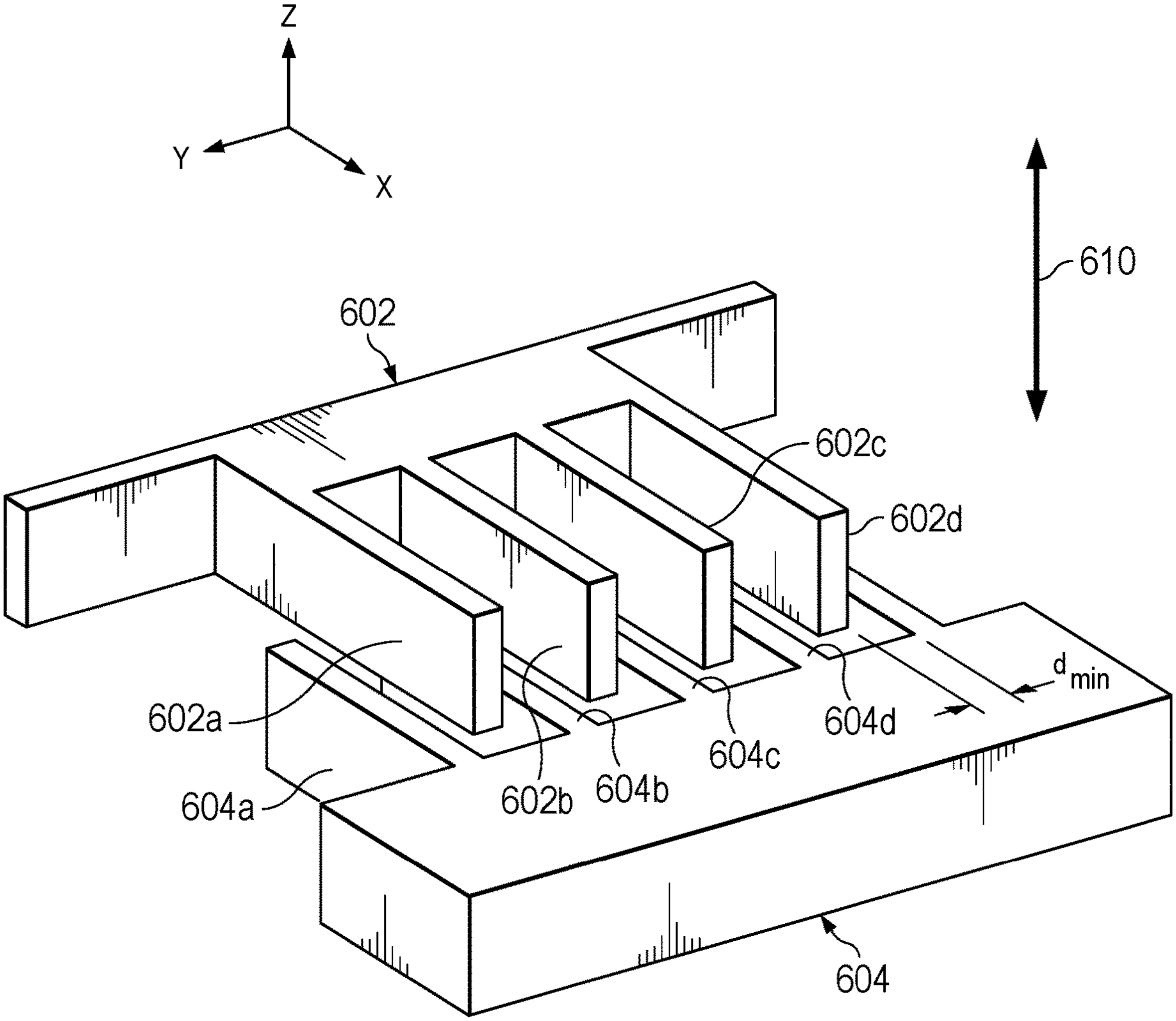

FIGS. 6A and 6B are schematics illustrating another example fringing field actuator and its operations. Referring to FIGS. 6A and 6B, a pair of comb structures 602 and 604 can form a fringing field actuator. Comb structure 602 can include finger electrodes 602*a*, 602*b*, 602*c*, and 602*d*, comb structure 604 can include finger electrodes 604*a*, 604*b*, 604*c*, and 604*d*, and the finger electrodes of the comb structures 602 and 604 can interdigitate. In some examples, comb structures 602 and 604 can be a comb drive. Comb structures 602 and 604 can each be coupled to a voltage source (not shown in the figures) to create an electrical potential difference between comb structures 602 and 604, which can generate fringing electric fields (e.g., fringing fields 606 and 608, represented by dotted arrows) between the edges of adjacent interdigitated finger electrodes (e.g., finger electrodes 602*c* and 604*c*, and finger electrodes 604*c* and 602*d*).

Referring to FIG. 6B, fringing electric fields 606 and 608 can generate an electrostatic force, and the electrostatic force can cause comb structures 602 and 604 to move with respect to each other along a direction 610 (e.g., along the z-axis) different from the directions of fringing electric fields 606 and 608. The strength of the fringing fields, as well as the strength of the electrostatic force, can increase as the distance between adjacent interdigitated finger electrodes of the comb structures decreases. For example, the electrostatic force between comb structures 602 and 604 can be at a maximum when the adjacent interdigitated finger electrodes have a zero distance between them along direction 610 (z axis in FIGS. 6A and 6B), and the distance between the adjacent interdigitated finger electrodes on a plane orthogonal to direction 610 (x-y plane in FIGS. 5A and 5B) can be at $d_{min}$.

Figure 7A:
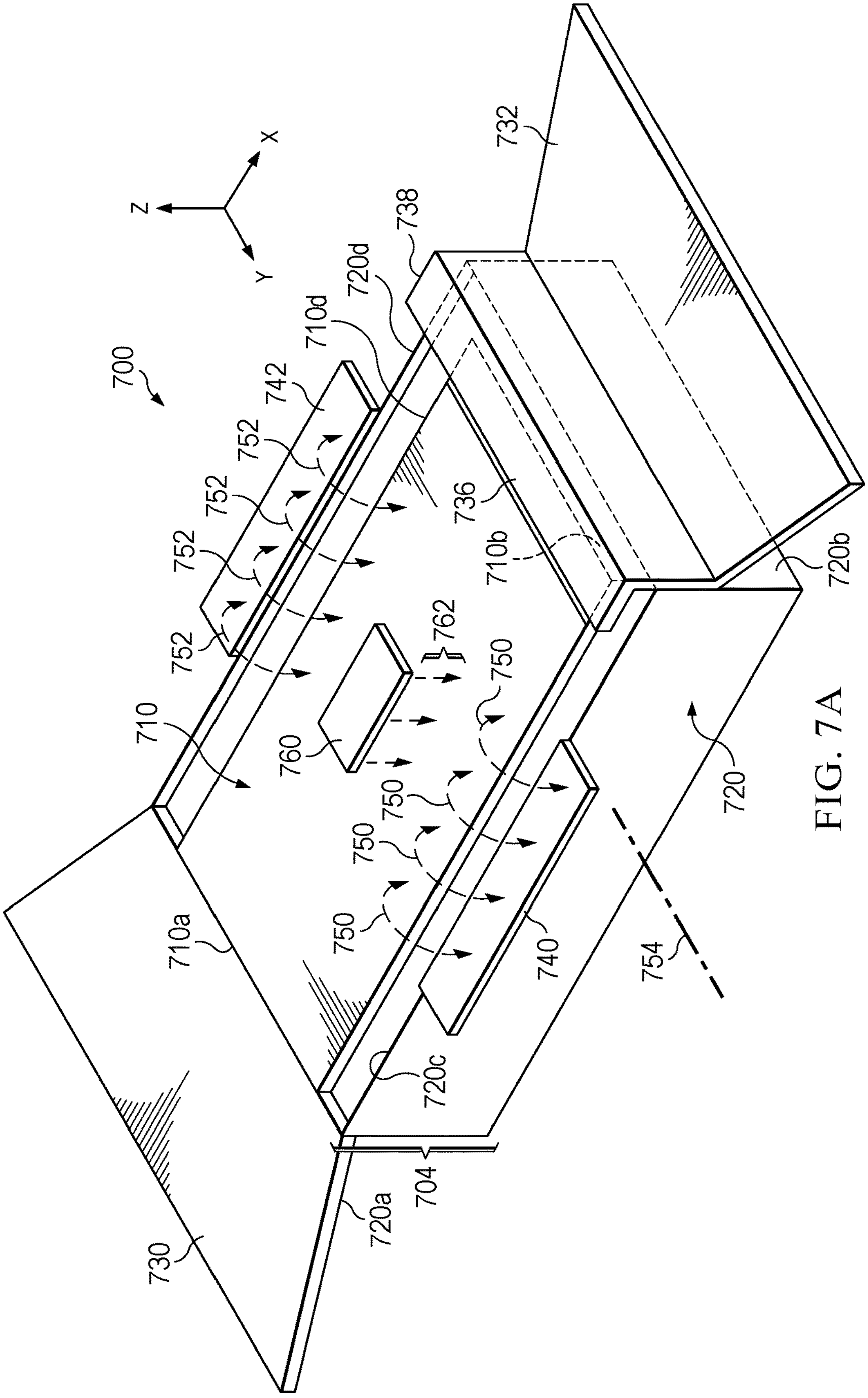
FIGS. 7A and 7B are schematics illustrating different views of an example electromechanical switch that includes fringing field actuators and a parallel actuator.
Figure 7B:
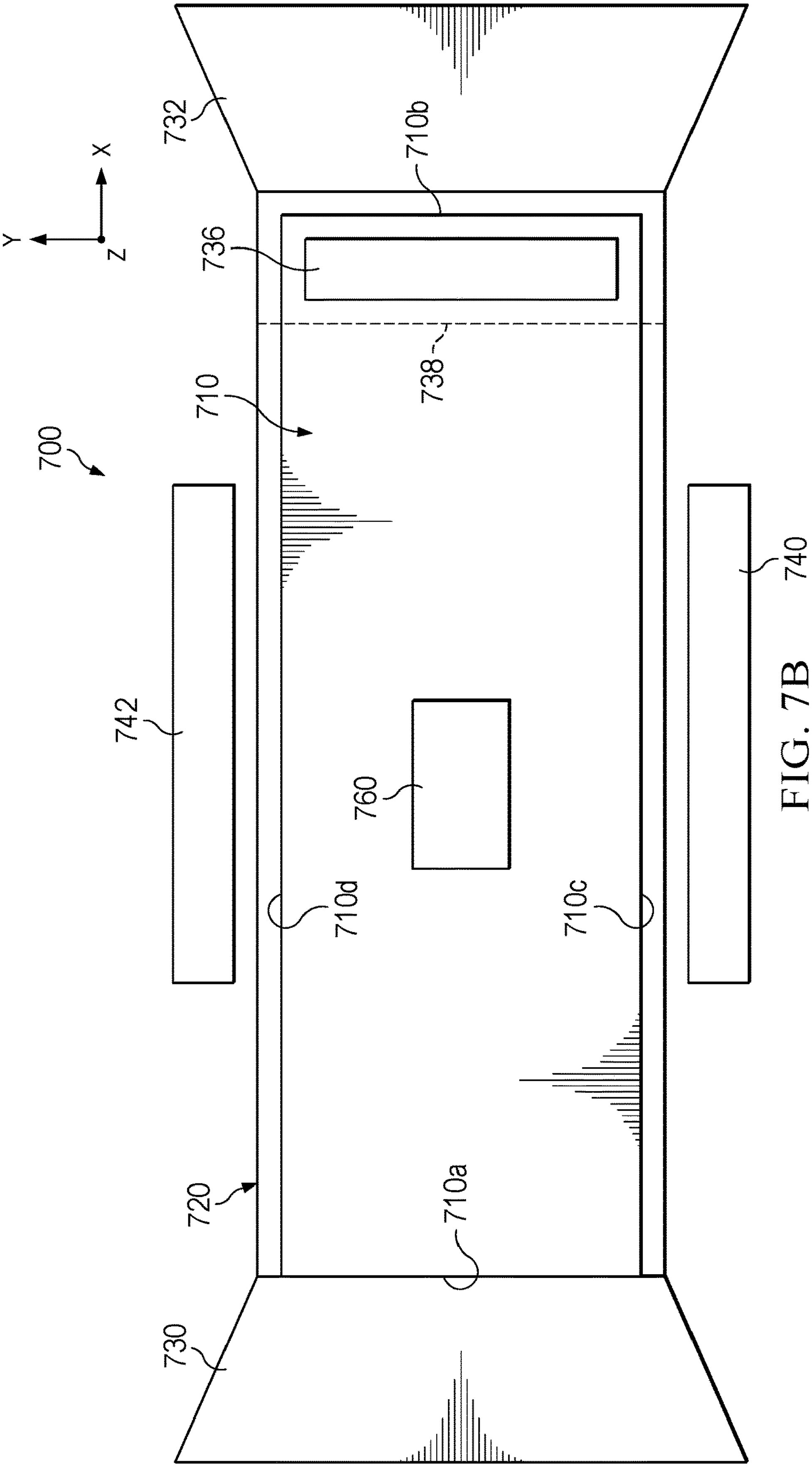

FIG. 7A and FIG. 7B are schematics illustrating an example of electromechanical switch 700 including fringing field actuators. FIG. 7A illustrates a perspective view, and FIG. 7B illustrates a plan view. In some examples, electromechanical switch 700 can be a micromechanical system (MEMS) relay including a semiconductor structure 704 having a beam 710 and a cavity 720. Beam 710 may be formed in a metal layer within the semiconductor structure or may otherwise be coated with a metal layer. Beam 710 has opposite ends/sides 710*a* and 710*b*, and opposite ends/sides 710*c* and 710*d*. Beam end 710*a* is coupled to, or extends from, a first side of cavity 720 (e.g., cavity side 720*a*). From end 710*a*, beam 710 extends into or above cavity 720 towards a second side of cavity 720 opposite to the first side (e.g., cavity side 720*b*) as shown. Beam 710 is elastic and deformable/bendable.

Electromechanical switch 700 includes an electrical terminal 730 on a first side of cavity 720 (e.g., cavity side 720*a*) and an electrical terminal 732 on a second side of cavity 720 opposite to the first side (e.g., cavity side 720*b*). End 710*a* of beam 710 is in continuous electrical connectivity with electrical terminal 730. End 710*b* of beam 710, which is opposite to end 710*a*, can include an electrical contact 736. Electrical contact 736 of the beam 710 is electrically coupled to electrical terminal 730 via beam 710. Electrical terminal 732 can include an extension 738 that overlaps partially with end 710*b* and electrical contact 736, and extension 738 can include an electrical contact. If beam 710 is in a bent state, electrical contact 736 can be in physical contact with extension 738, thereby closing the electromechanical switch 700 to permit current to flow between terminals 730 and 732. If beam 710 is restored its original unbent state, electrical contact 736 becomes spaced apart from extension 738, thereby opening electromechanical switch 700.

Electromechanical switch 700 can also include fringing field actuators 740 and 742, each including a rectangular conductor on a periphery of beam 710. In the example of FIG. 7, fringing field actuator 740 can be on a third side of cavity 720 facing beam end 710*c* (e.g., cavity side 720*c*), and fringing field actuator 742 can be on a fourth side of cavity 720 facing beam end 710*d* (e.g., cavity side 720*d*). Electromechanical switch 700 can include, or otherwise be couple to, a voltage source coupled to fringing field actuators 740 and 742 to set their electrical potentials. Beam 710

(or beam ends 710*c* and 710*d*) can have the electrical potential of electrical terminal 730. Beam ends 710*c* and 710*d* can also have the electrical potential set by another voltage source if they are insulated from electrical terminal 730. The electrical potential differences between fringing field actuator 740 and beam end 710*c* can generate fringing electric field 750, and the electrical potential differences between fringing field actuator 742 and beam end 710*d* can generate fringing electric field 752. The fringing electric fields can generate electrostatic forces on beam ends 710*c* and 710*d*, and the electrostatic forces can bend beam 710 around axis 754 between beam ends 710*a*/710*b*. The bending of beam 710 can bring electrical contact 736 on beam end 710*b* into physical contact with extension 738 to close electromechanical switch 700.

In some examples, electromechanical switch 700 can include an optional planar conductor 760 that overlaps part of a surface of beam 710. An electrical potential difference between planar conductor 760 and the overlapped part of beam 710 can generate electric field 762, which can provide parallel plate actuation of beam 710, in combination with the fringing field actuation provided by fringing field actuators 740 and 742. In some examples, the parallel plate actuation can be provided as an auxiliary to the fringing field actuation (e.g., by providing less than 50% of total electrostatic force exerted on beam 710), which can reduce the impact velocity of beam 710 onto planar conductor 760 and reduce oscillation. Also, in some examples, planar conductor 760 can be spaced apart from the surface of beam 710 so that when beam end 710*b* is in physical contact with extension 738, and the distance between planar conductor 760 and beam 710 is at a minimum, beam 710 is well within the stable equilibrium state and far away from the unstable equilibrium state as described in FIG. 3, which can reduce contact speed and improve reliability.

Figure 8:
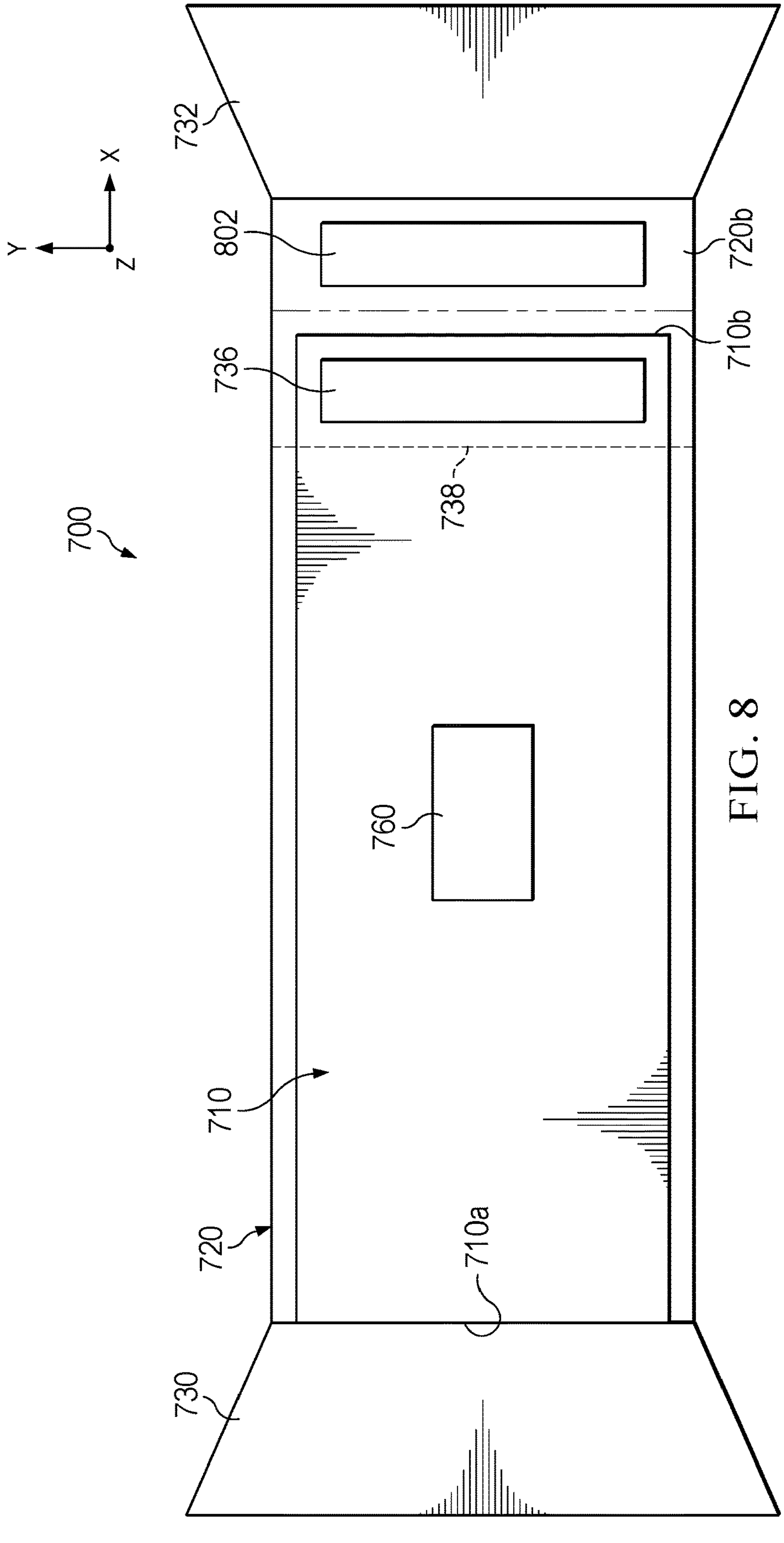
FIGS. 8-11 are schematics illustrating plan views of the electromechanical switch of FIGS. 7A and 7B having fringing field actuators at different example locations.

FIG. 8 illustrates a plan view of another example electromechanical switch 700. In FIG. 8, electromechanical switch 700 can include a fringing field actuator 802 on cavity side 720*b* facing beam end 710*b*, and extension 738 can overlap at least part of fringing field actuator 802. Fringing field actuator 802 can include a rectangular conductor and generate a fringing electric field between an edge of fringing field actuator 802 and beam end 710*b*. The fringing electric field can generate an electrostatic force on beam end 710*b*, and the electrostatic force can move beam end 710*b* (and contact 736) towards extension 738. The example electromechanical switch 700 in FIG. 8 may also include fringing field actuators 740 and 742, which are not shown in FIG. 8.

Figure 9:
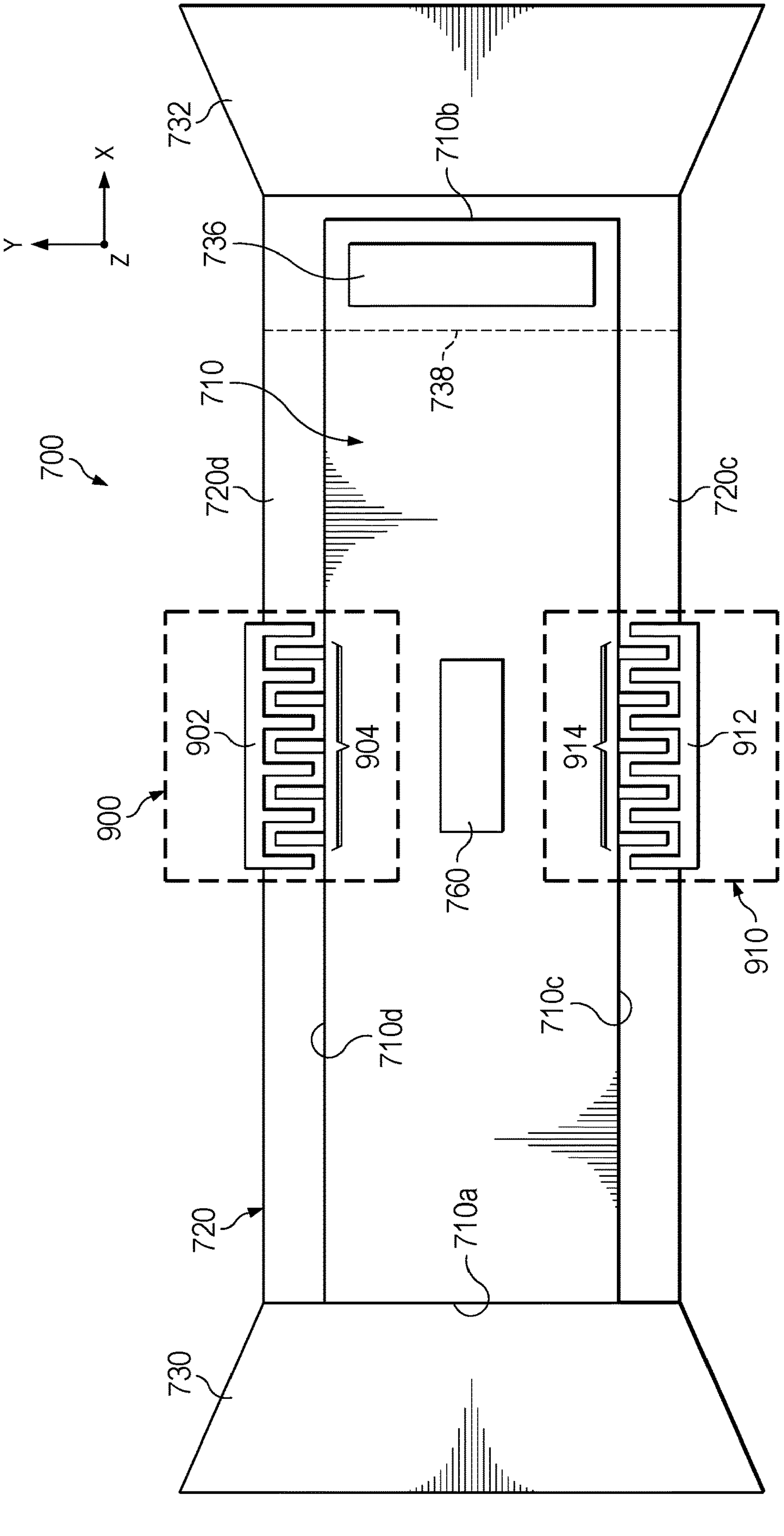
Figure 10:
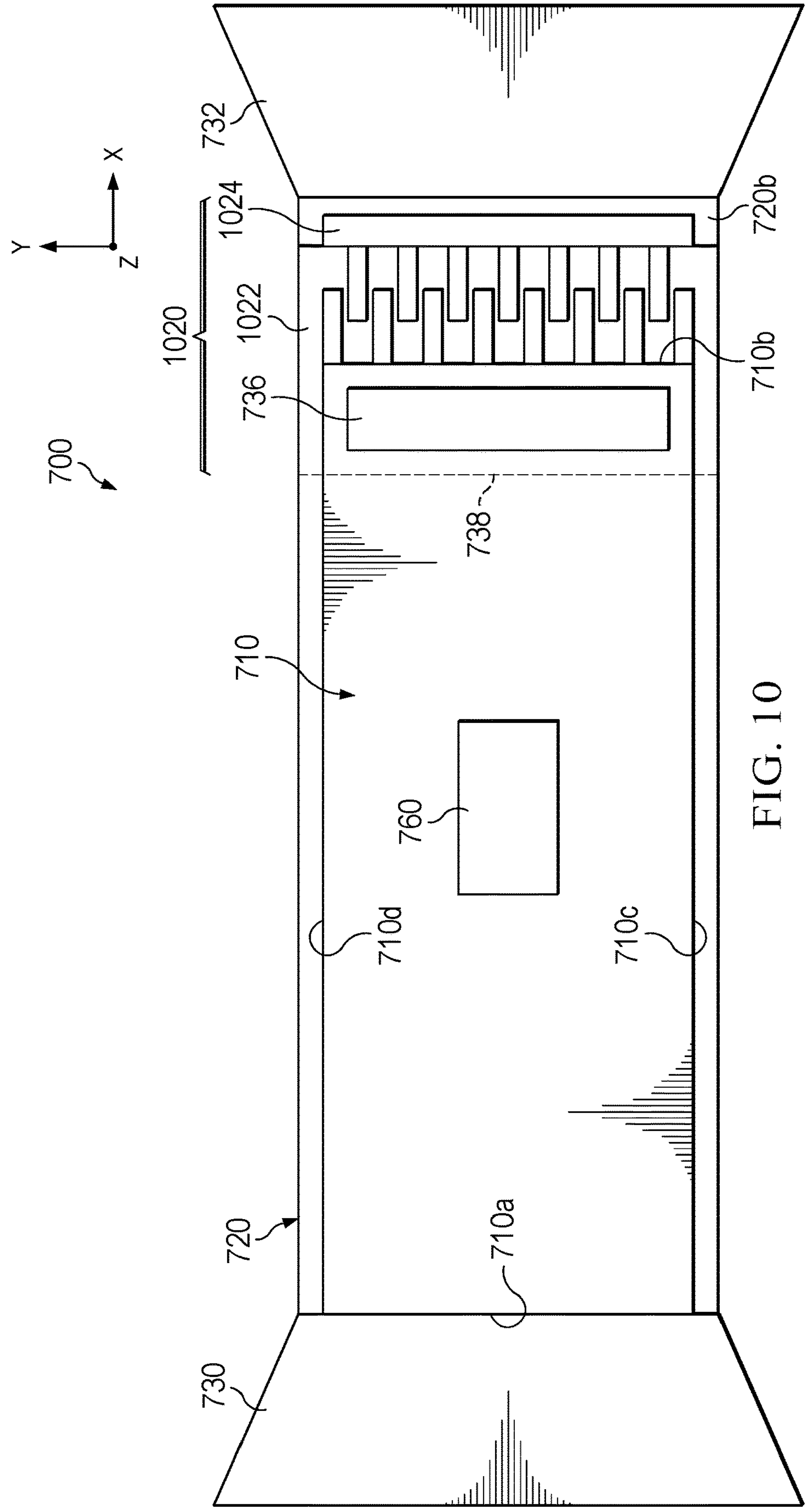
Figure 11:
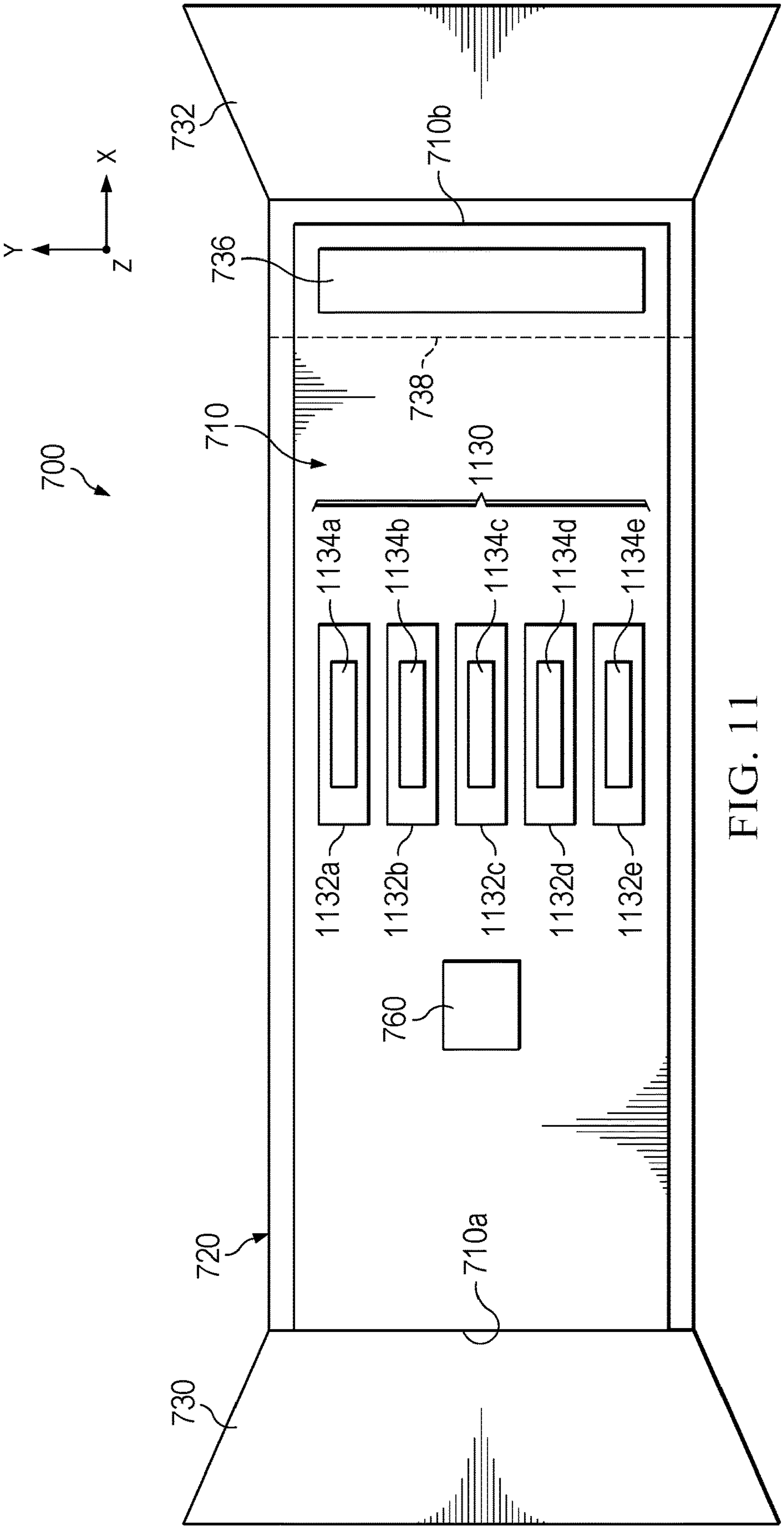

FIG. 9, FIG. 10, and FIG. 11 illustrate plan views of additional examples of electromechanical switch 700 having fringing field actuators in the form of comb drives. Referring to FIG. 9, electromechanical switch 700 can include a comb drive 900 including a comb structure 902 on cavity side 720*d* and a comb structure 904 on beam end 710*d*. Also, electromechanical switch 700 can include a comb drive 910 including a comb structure 912 on cavity side 720*c* and a comb structure 914 on beam end 710*c*. Comb structures 902 and 904 can have interdigitated finger electrodes to generate fringing electric fields, which can generate electrostatic forces on beam ends 710*c* and 710*d* to bend beam 710.

Also, FIG. 10 illustrates a plan view of another example electromechanical switch 700 including a comb drive 1020 on cavity side 720*b* facing beam end 710*b*. Comb drive 1020 includes a comb structure 1022 on beam end 710*b* and a comb structure 1024 on cavity side 720*b*. Comb structures 1022 and 1024 can have interdigitated finger electrodes to generate fringing electric fields, which can generate electrostatic forces on beam end 710*b* to bend beam 710. The example electromechanical switch 700 in FIG. 10 may also include comb drives 900 and 910 of FIG. 9, which are not shown in FIG. 10.

Further, FIG. 11 illustrates a plan view of another example electromechanical switch 700 including a comb drive 1130 within the footprint of beam 710. Specifically, in FIG. 11, beam 710 can include multiple openings 1132, including openings 1132*a*, 1132*b*, 1132*c*, 1132*d*, and 1132*e*, and beam 710 can include a finger electrode between adjacent openings 1132. Also, electromechanical switch 700 includes finger electrodes 1134 that overlap with openings 1132. For example, finger electrode 1134*a* overlaps with opening 1132*a*, finger electrode 1134*b* overlaps with opening 1132*b*, finger electrode 1134*c* overlaps with opening 1132*c*, finger electrode 1134*d* overlaps with opening 1132*d*, and finger electrode 1134*e* overlaps with opening 1132*e*. The finger electrodes 1134 can be interdigitated with the finger electrodes of beam 710 to form comb drive 1030. The interdigitated finger electrodes can generate electrostatic forces on an inner portion of beam 710 to bend beam 710. The example electromechanical switch 700 in FIG. 11 may also include comb drives 900 and 910 of FIG. 9 and comb drive 1020 of FIG. 10, which are not shown in FIG. 11.

Figure 12:
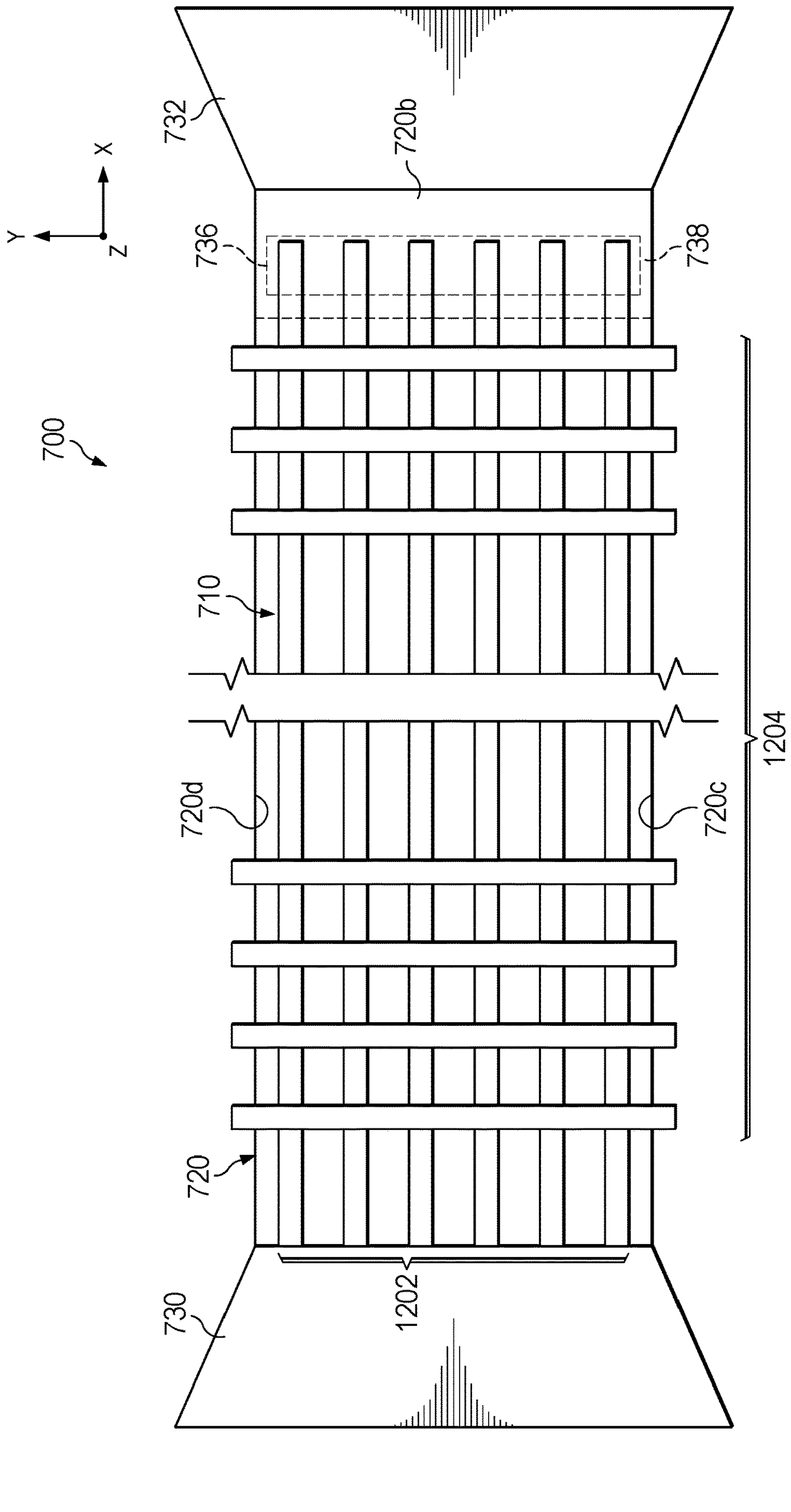
FIG. 12 is a schematic illustrating a plan view of an example perforated beam of the electromechanical switch of FIGS. 7A and 7B.

FIG. 12 illustrates a plan view of an example beam 710. Referring to FIG. 12, beam 710 can be perforated and can include a set of parallel metal segments 1202 and a set of parallel metal segments 1204. Parallel metal segments 1202 are orthogonal to and crisscross with parallel metal segments 1204 to form a perforated beam 710. Such arrangements can reduce the mass of beam 710, which in turn can reduce the amount of electrostatic force to move and bend beam 710, and improve the power efficiency in operating electromechanical switch 700.

Also, some (or all) of parallel metal segments 1204 can extend towards cavity sides 720*c* and 720*d* as part of comb structures 904 and 914 of FIG. 9. Also, some (or all) of parallel metal segments 1202 can extend towards cavity side 720*b* as part of comb structure 1022 of FIG. 10. Also, some of the openings formed by adjacent crisscrossed parallel metal segments 1202 and 1204 can provide openings 1132 of FIG. 11, and some (or all) of the parallel metal segments 1202 and 1204 can be the finger electrodes of comb drive 1130 of FIG. 11. Also, the part of parallel metal segments 1202 and 1204 proximate beam end 710*b* overlaps with extension 738 and can form electrical contact 736.

Figure 13:
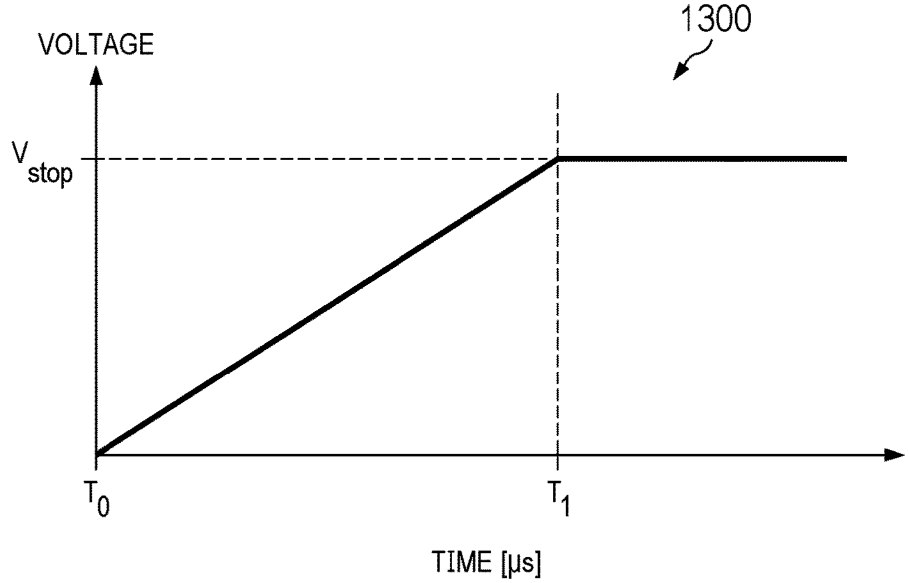
FIG. 13 is a graph of voltage versus time for an example operation of the electromechanical switch of FIGS. 7A and 7B.

FIG. 13 illustrates a graph 1300 of variation of voltage over time provided by a voltage source coupled to examples of fringing field actuators of FIGS. 7-11. The voltage can set an electrical potential difference across the fringing field actuators (e.g., fringing field actuators 740 and 742 of FIG. 7, 802 of FIGS. 8, 900 and 910 of FIG. 9, 1020 of FIG. 10, and 1130 of FIG. 11). Referring to FIG. 13, the voltage source can provide a voltage ramp where the voltage (and the electrical potential difference) increases with time, starting from time $T_0$. The voltage source can stop the voltage ramp when the voltage reaches a value $V_{stop}$ at time $T_1$, where the distance between the fringing field actuators (e.g., between adjacent interdigitated finger electrodes) is at a minimum, and electrical contact 736 is in physical contact with extension 738 to close electromechanical switch 700. The voltage source can maintain the voltage at $V_{stop}$ (or increase the voltage further, as to be described below) after $T_1$ to maintain electromechanical switch 700 in the closed state. The voltage source can set the voltage to zero responsive to a signal to open electromechanical switch 700.

Figure 14:
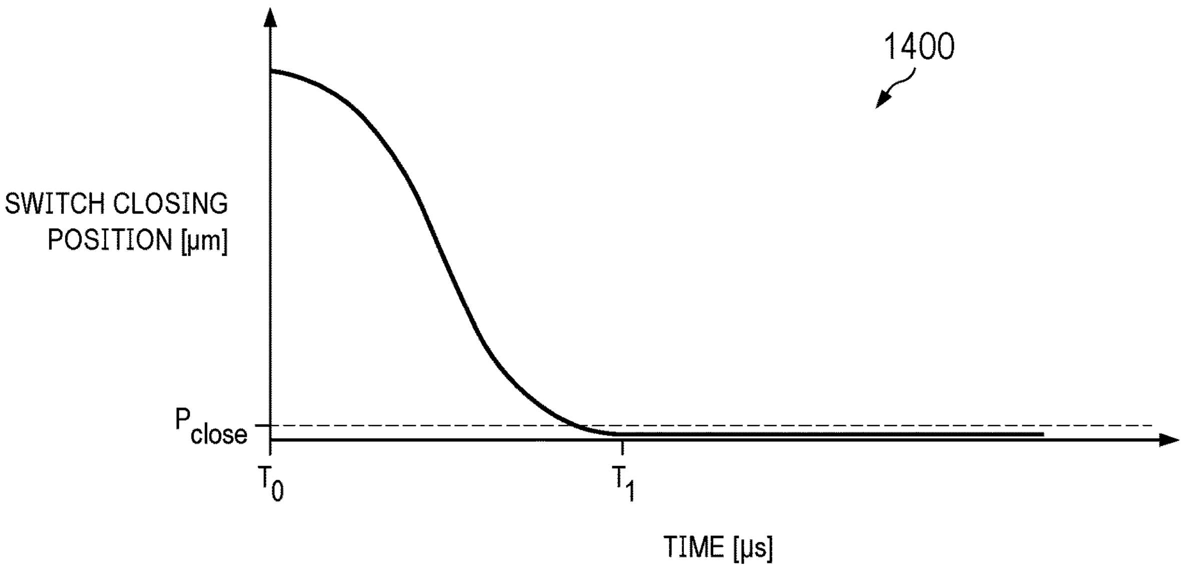
FIG. 14 is a graph illustrating a movement over time of a beam of the electromechanical switch of FIGS. 7A and 7B.

FIG. 14 includes a graph 1400 of movement of beam 710 with time as beam end 710*b* approaches a particular position $P_{close}$ to close the switch, responsive to the voltage signal represented in FIG. 13. Beam end 710*b* can be at a maximum distance from extension 738 at time $T_0$, and can reach the position $P_{close}$ to close the switch at time $T_1$. Compared with graph 400, due to the use of fringing field actuators beam end 710*b* can approach and come into physical contact with extension 738 at a lower impact speed. Accordingly, beam end 710*b* does not bounce off from extension 738 and oscillation can be reduced or eliminated, which can result in a soft touch operation. Because of the reduction or elimination of oscillation, electromechanical switch 700 can be in the stable closed state after a much shorter time in FIG. 14 than in FIG. 4. The reduced impact velocity can also reduce the degradation of beam 710 and extension 738 and extend the lifespan of electromechanical switch 700.

Besides impact speed, another parameter that affects the performance of an electromechanical switch is the holding force applied by the actuator onto the two electrical contacts after physical contact is made. A high holding force allows the metal particles of the two electrical contacts to bond and form a weld, which can reduce the electrical resistance between the electrical contacts of the switch and is desirable. One way to increase the holding force is through use of a parallel plate capacitor actuator, which can apply a larger force between the beam and the extension. At the same time, features are included as part of the electromechanical switch to increase the stiffness of beam 710 when the beam is in the bent state. The increased stiffness can increase the mechanical restoring force of beam 710, and the actuator may provide an increased electrostatic force to counter the increased mechanical restoring force so that beam 710 can be in the equilibrium state. The increased electrostatic force, in turn, can increase the holding force and reduce the electrical resistance between the electrical contact 736 and extension 738. Also, the increased mechanical restoring force (due to the increased stiffness) can facilitate separation of electrical contact 736 from extension 738 when the actuators stop providing the electrostatic force, despite the wedding of the metal particles between electrical contact 736 and extension 738.

Figure 15:
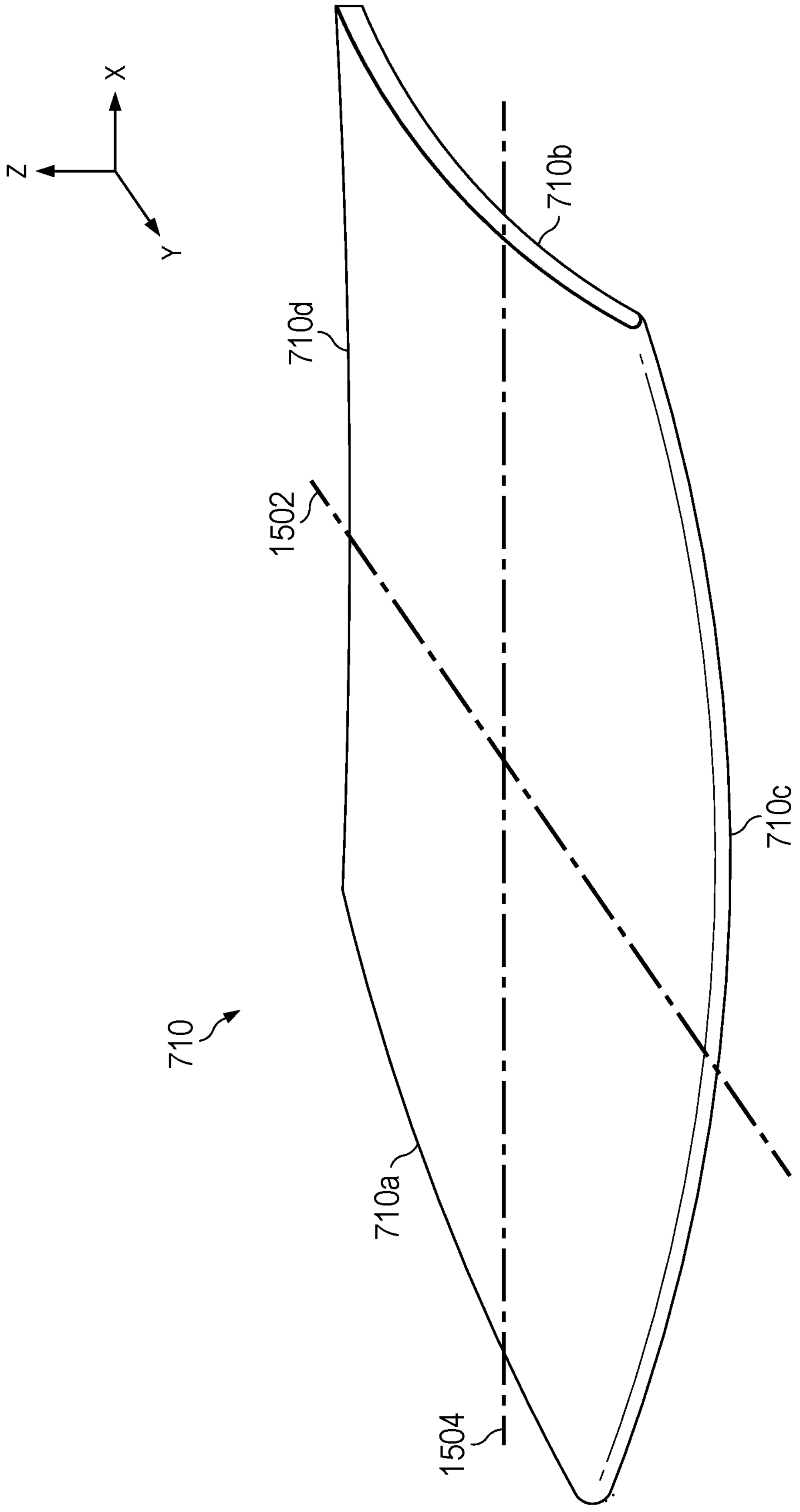
FIG. 15 is a schematic illustrating a perspective view of a beam of the electromechanical switch of FIGS. 7A and 7B undergoing multi-axial bending.

FIG. 15 is a schematic illustrating beam 710 bent around multiple orthogonal axes in such a way as to increase the beam's stiffness. For example, beam 710 can be bent around a first axis, such as axis 1502 along the y axis between beam ends 710*a* and 710*b*, to bring beam end 710*b* (and electrical contact 736) into physical contact with extension 738 to close electromechanical switch 700. Beam 710 can also be bent around one or more second axes that is orthogonal to the first axis, such as axis 1504 along the x axis between beam ends 710*c* and 710*d*. The bending of beam 710 can be performed in a multi-phase operation. In a first phase, beam 710 can be bent around axis 1502 to bring beam end 710*b* into physical contact with extension 738, which creates stiffness in beam 710. In a second phase, beam 710 can be bent around axis 1504 (or other axes parallel with axis 1504) to further increase the stiffness of beam 710 and increase holding force on beam end 110*b* and extension 738, which can further increase the stiffness of beam 710 and weld beam end 110*b* with extension 738.

Figure 16:
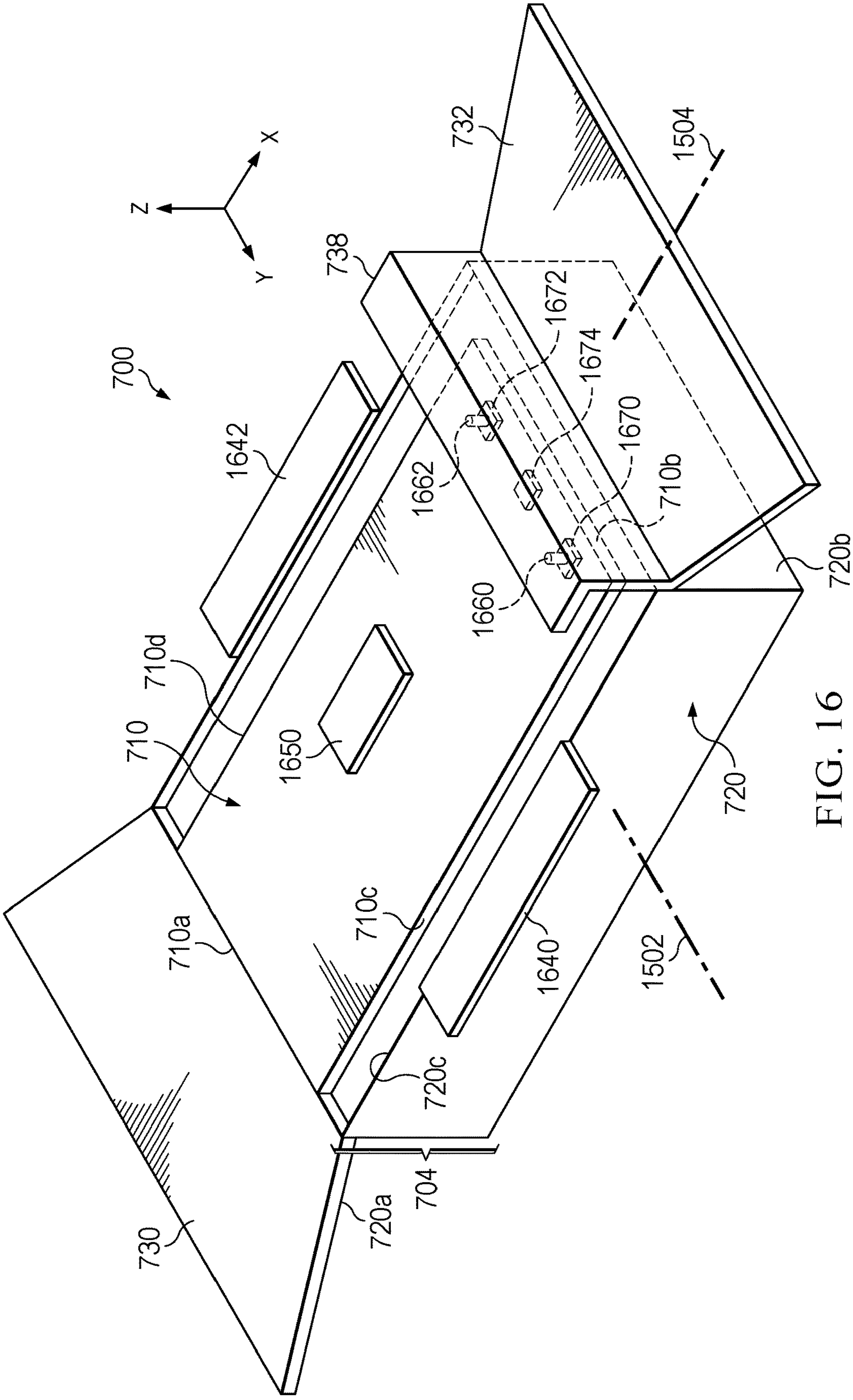
FIG. 16 is a schematic that illustrates an example of electromechanical switch that supports multi-axial bending.

FIG. 16 is a schematic that illustrates an example of electromechanical switch 700 that supports multi-axial bending. Referring to FIG. 16, electromechanical switch 700 can include one or more actuators, including actuators 1640, 1642, and/or 1650, to exert force (e.g., electrostatic force) on beam 710. In some examples, actuators 1640 and 1642 can include fringing field actuators, such as fringing field actuators 740 and 742 of FIG. 7, 802 of FIGS. 8, 900 and 910 of FIG. 9, 1020 of FIG. 10, and 1130 of FIG. 11. In some examples, actuators 1640 and 1642 can include other types of actuators, such as magnetic field actuators, piezoelectric actuators, etc. In some examples, actuator 1650 can include a planar conductor, such as planar conductor 760, to provide parallel plate actuation of beam 710. Actuators 1640 and 1642 can combine to provide actuation of beam 710 and causes beam 710 to bend around axis 1502.

Also, the example electromechanical switch 700 of FIG. 16 can include protrusion structures 1660 and 1662 between beam end 710*b* and extension 738. Protrusion structure 1660 can be proximate beam end 710*c*, and protrusion structure 1662 can proximate beam end 710*d*. In some examples, electromechanical switch 700 can include additional protrusion structures between protrusion structures 1660 and 1662. Protrusion structures 1660 and 1662 can be part of extension 738, part of beam end 710*b*, or both. Also, beam end 710*b* an include contacts 1670, 1672, and 1674. Contact 1670 can also be an outer contact that is proximate beam end 710*c* and overlap with protrusion structure 1660. Also, contact 1672 can be an outer contact that is proximate beam end 710*d* and overlap with protrusion structure 1662. Further, contact 1674 can be an inner contact between outer contacts 1670 and 1672. Protrusion structures 1660 and 1662, and the part of extension 738 between protrusion structures 1660 and 1662, can define a curvature. As actuators 1640 and 1642 exert forces on beam 710, beam end 710*b* can be pushed against extension 738, and protrusion structures 1660 and 1662 can cause beam end 710*b* to bend around axis 1504 following the curvature, in which protrusion structures 1660 and 1662 are in physical contact with the respective contacts 1670 and 1672, and contact 1674 is in physical contact with extension 738.

In some examples, contact 1674 is an electrical contact (e.g., being part of electrical contact 736), while contacts 1670 and 1672 can each be electrical contacts or electrical insulator/non-conductive mechanical contacts. Also, in some examples, protrusion structures 1660 and 1662 can be conductive if contacts 1670 and 1672 are electrical contacts. Protrusion structures 1660 and 1662 can also be non-conductive if contacts 1670 and 1672 are also non-conductive. In some examples, protrusion structures 1660 and 1662 and contacts 1670 and 1672 can be made of silicon dioxide.

Figure 17A:
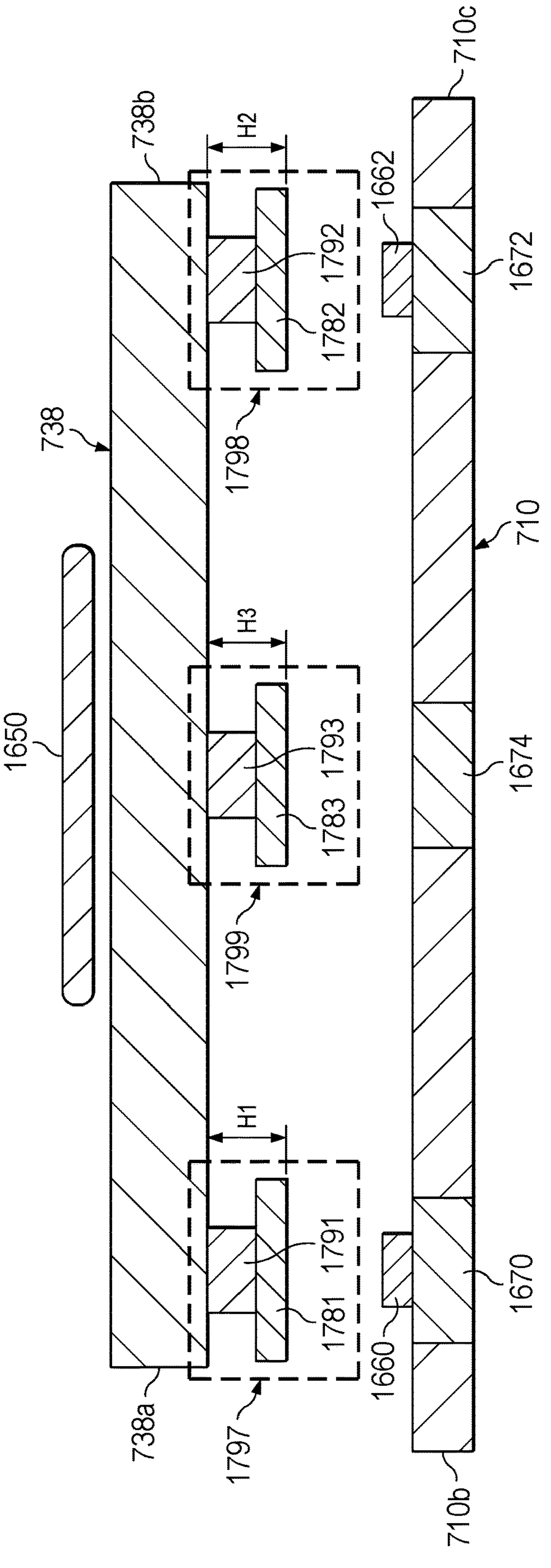
FIGS. 17A-17C are schematics illustrating side views of example components of the electromechanical switch of FIG. 16 and their operations.

FIG. 17A is a schematic that illustrates examples of protrusion structures between extension 738 and beam 710. While FIG. 17A shows these as decreasing the gap distance from the bottom the protrusion process/structure by adding material, the effect can be created by removing and not just adding material. In the example shown in FIG. 17A, material (e.g., silicon dioxide) can be added to parts of beam 710 above contacts 1670 and 1672 to provide the respective protrusion structures 1660 and 1662. In some examples, some of the beam material of beam 710 above contact 1674 can be selectively removed, and the remaining beam material in the parts of beam 710 (e.g., silicon or metal) above contacts 1670 and 1672 can become protrusion structures 1660 and 1662.

In some examples, a silicon dioxide material can be deposited onto beam 710, followed by photoresist patterning and etching processes to selectively remove the deposited silicon dioxide material above contact 1674. The remaining silicon dioxide material above contacts 1670 and 1672 can provide the respective protrusion structures 1660 and 1662. In some examples, beam 710 can also be selectively etched to selectively remove the beam material from above contact 1674, and the remaining beam material above contacts 1670 and 1672 can become protrusion structures 1660 and 1662. The gap distance is therefore controlled by the etch rate which can vary across wafer or between wafers.

Referring to FIG. 17A, protrusion structures 1660 and 1662 are coupled to or otherwise formed on outer contacts 1670 and 1672. In one example, all three contacts 1670, 1672, and 1674 and protrusion structures 1660 and 1662 are electrically conductive and thus are electrical contacts. Contacts 1670, 1672, and 1674 and protrusion structures 1660 and 1662 may be made from a conductive material such as a metal (e.g., aluminum). In another example, the beam's end 710*b* only has one contact, not three contacts. For example, the beam's end 710*b* may only have the inner contact 1674, and not the outer two contacts 1670 and 1672. In this latter example, although outer contacts 1670 and 1672 may not be present, the protrusion structures 1660 and 1662 are still present. In one example, the contacts 1670-1674 are a different material than the material which forms the beam 710. In another example, the contacts 1670-1674 are part of the beam material itself and are not separate elements.

In some examples, extension 738 may also include protrusion structures 1797, 1798, and 1799 that extend towards the beam 710 from the extension 738. Each protrusion structure 1797-1799 includes a post and a contact. Protrusion structure 1797 includes post 1791 and contact 1781. Protrusion structure 1798 includes post 1792 and contact 1782. Protrusion structure 1799 includes post 1793 and contact 1783. Protrusion structures 1797 and 1798 are proximate the sides 738*a* and 738*b* of the extension 738 and thus proximate the sides of the cavity of the MEMS relay. Protrusion structures 1797-1799 have heights H1, H2, and H3, respectively. In one example, H1, H2 and H3 are the same. In another embodiment, H1 and H2 are the same and H3 is different (e.g., shorter). In some examples, posts 1791-1793 and contacts 1781-1783 are electrically conductive. In some examples, contact 1674 is an electrical contact on the beam's end 710*b*, and protrusion structure 1799 (post 1793 and contact 1783) on extension 738 are made from an electrically conductive material, while protrusion structures 1797 (including post 1791 and contact 1781) and 1798 (including post 1792 and contact 1782) can be made of an electrical insulator material (e.g., silicon dioxide). In some examples (not shown in the figures), protrusion structures 1797, 1798, and 1799 can be part of beam 710, with ends of posts 1791-1793 facing extension 738.

Figure 17B:
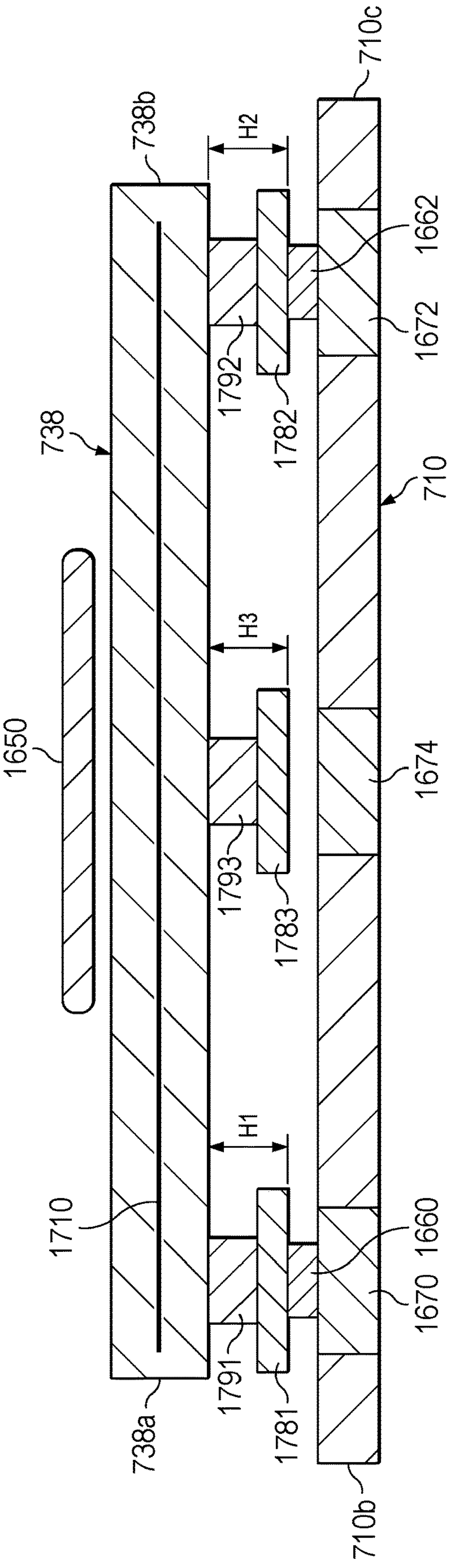
Figure 17C:
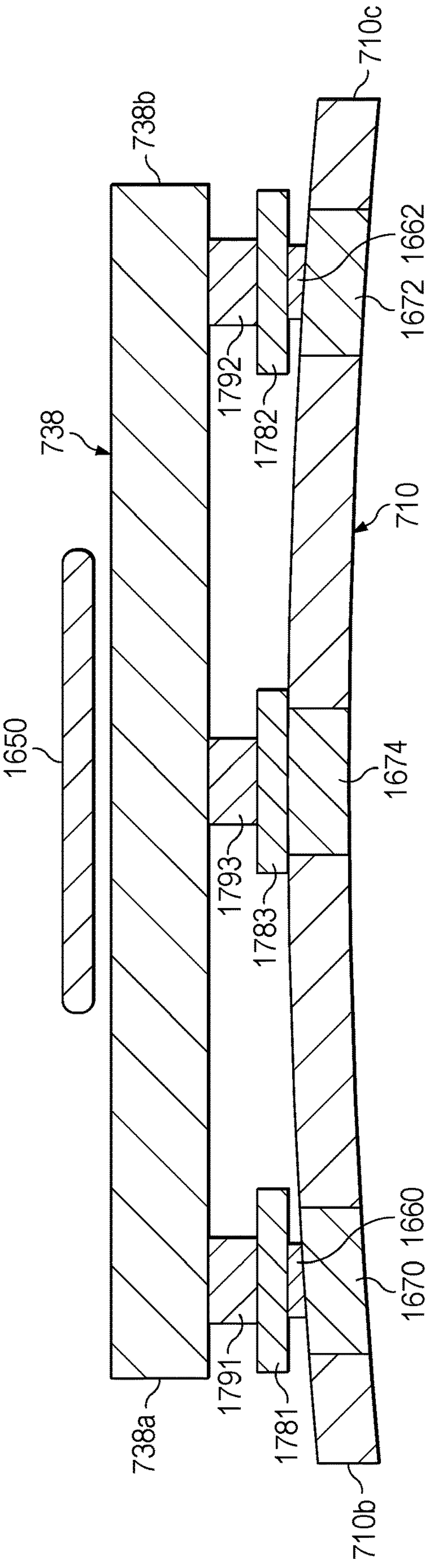

FIGS. 17A, 17B, and 17C also illustrate example states of beam 710 as electromechanical switch 700 transitions from an open state to a closed state. FIG. 17A illustrates a state of beam 710 when electromechanical switch 700 is in open state. In FIG. 17A, actuators 1640, 1642, and 1650 can be disabled and do not exert electrostatic force on beam 710. Beam 710 can be in its original unbent state, and contacts 1670-1674 are not in contact with the corresponding contacts 1781-1783 of the extension 738. In this state, the contact force between the beam's contacts and the extension's contacts is zero.

FIG. 17B illustrates a state of beam 710 where electromechanical switch 700 is in a first phase of the closed state. In FIG. 17B, actuators 1640, 1642, and 1650 can each receive a first voltage and exert a first electrostatic force on beam 710, which causes beam 710 to bend toward extension 738 around axis 1502 (FIG. 15). In the first phase of the closed state, protrusion structures 1660 and 1662 of the contacts 1670 and 1672 are in physical contact with the respective contacts 1781 and 1782 on the extension 738, while contact 1674 is spaced from contact 1783.

The voltage provided to actuators 1640, 1642, and 1650 can continue increasing, which also increases the electrostatic force exerted on beam 710. The increased electrostatic force exerted by actuator 1650 can cause the beam to bend around axis 1604 and brings contact 1674 towards contact 1783. The fringing electric field does not have so large of a magnitude that the relative velocity of the protrusion structures 1660 and 1662 relative to contacts 1781 and 1782 causes damage to the contacts.

FIG. 17C illustrates a state of beam 710 where electromechanical switch 700 is in a second phase of the closed state where contact 1674 is in physical contact with contact 1783. In FIG. 17C, actuators 1640, 1642, and 1650 can each receive a second voltage and exert a second electrostatic force large enough to cause beam 710 to bow along at least a portion of its longitudinal axis 1504 (FIG. 15). Because the protrusion structures 1660 and 1662 proximate the ends 710*b* and 710*c* of the beam 710 are already touching the extension's contacts 1781 and 1782, the beam 710 bows in the middle until beam contact 1674 touches extension contact 1783. Towards the end of the second phase, the contact force at the interface between the beam's contact 1674 and the extension's contact 1783 increases at a much faster rate with increasing voltage than at the beginning of the second phase when contact 1674 starts touching contact 1783. The increasing electric field due to the actuator 1650 also increases in the contact force for the outer contacts 1670 and 1672 at a higher rate than at the beginning of the second phase and in the first phase. In the second phase of the closed state, the contact forces on all three contacts 1670-1674 can be approximately the same.

Figure 18:
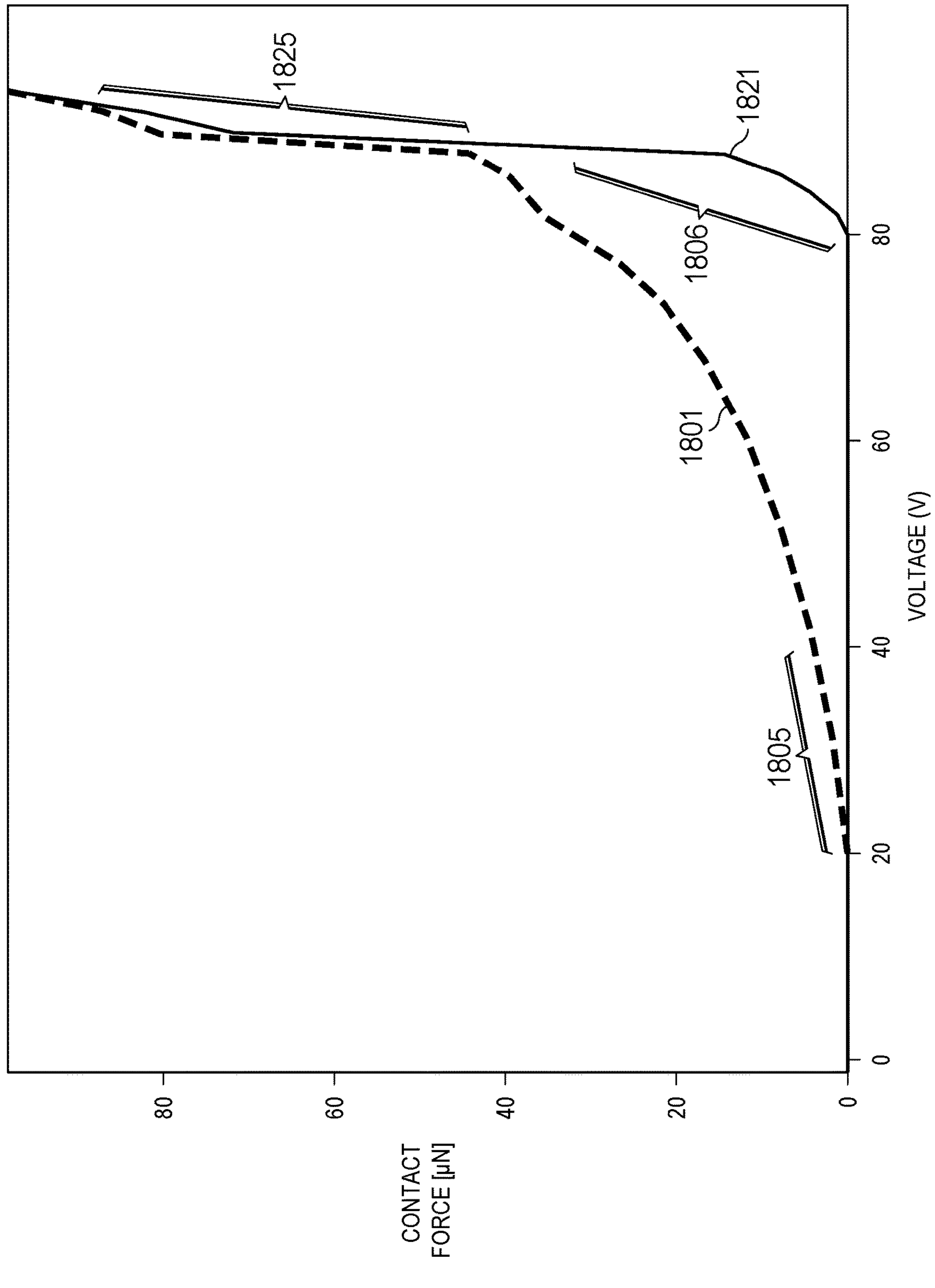
FIG. 18 is a graph illustrating contact force actuator voltage for the electromechanical switch of FIG. 16.

FIG. 18 are graphs illustrating example relationships between the force on the contacts with respect to voltage provided to the actuators. FIG. 18 shows two graphs 1801 and 1821. Graph 1801 illustrates a relationship between the contact force on outer contacts 1670 and 1672 and the voltage, and graph 1821 illustrates a relationship between the contact force on inner contact 1674 and the voltage.

In this example, none of the contacts on the beam are in contact with the extension 738 until the voltage rises to approximately 20V. Once the voltage reaches 20V, as explained above, the fringing field is large enough to cause outer contacts 1670 and 1672 to touch extension contacts 1781 and 1782, and the contact force on outer contacts 1670 and 1672 starts to increase with voltage. With voltage provided to the actuators within the range of 20V-80V, the contact force for contacts 1670 and 1672 increases relatively slowly with the voltage, as shown in graph portion 1805. Electromechanical switch 700 thus initially establishes a relatively soft (low velocity) contact on the outer contacts 1670 and 1672. Within this voltage range, inner contact 1674 is not yet touching contact 1783, and the contact force on inner contact 1674 can be at zero.

As the voltage increases above 80V, the electric field due to actuator 1650 becomes large enough that the beam 710 begins to bend along axis 1504 as shown in FIG. 17C. The force on contact 1674 rapidly increases with voltage, as shown in graph portion 1806. Also, as the voltage increase above 90V, the contact forces on outer contacts 1670 and 1672 and inner contact 1674 can be equal, as shown in graph portion 1825.

The example electromechanical switch 700 of FIGS. 16-17C thus initially establishes a relatively soft (low velocity) contact on the outer contacts 1670 and 1672 due to the fringing electric fields, and then dramatically increases the contact force on all three contacts 1670, 1672, and 1674 due to the electric field caused by the actuator 1650. As a result, a sufficiently high force contact is established to advantageously cause the contact(s) on the beam's end 710*b* to be welded to the corresponding contact(s) on the extension 738 thereby creating a low resistance contact but without an initial damaging high velocity impact between the contacts.

Moreover, as explained above, while a contact weld can be formed with high contact force to reduce the contact resistance, the bending of beam 710 around axis 1504 also increases the stiffness laterally across the beam along direction 1710. The increased stiffness can facilitate the separation between contacts 1670-1674 and extension 738 to open electromechanical switch 700. To open electromechanical switch 700, a controller (described below) reduces the magnitude of the voltage applied to the actuators, which reduces the electrostatic force exerted on beam 710. With the reduced electrostatic force, the increased beam lateral stiffness due to the outer protrusion structures allow beam 710 to return to its original state, which causes the weld formed between contacts 1674 and 1783 to more easily separate.

Figure 19A:
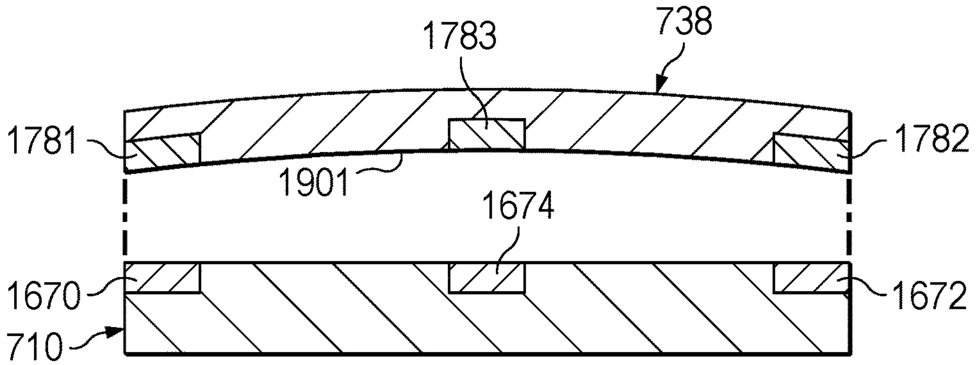
FIGS. 19A-19C are schematics illustrating example operations of the electromechanical switch of FIG. 16.
Figure 19B:
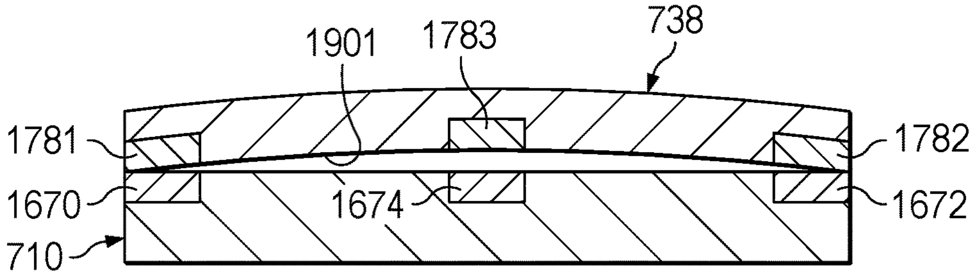
Figure 19C:
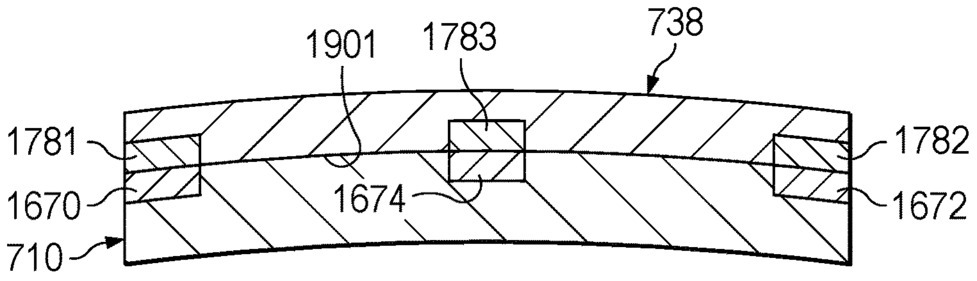

In some examples, extension 738 can include a curved surface that defines the curvature. FIGS. 19A, 19B, and 19C are schematics that illustrate examples of extension 738 having a curved surface 1901 and example states of beam 710 as electromechanical switch 700 transitions from an open state to a closed state. FIG. 19A is an end-view of a beam 710 and a curved extension 738 having curved surface 1901 facing beam 710. The beam 710 in this example has three electrical contacts 1670, 1672, and 1674 made of a conductive material (e.g., a metal such as aluminum). The curved extension 738 also has the three corresponding electrical contacts 1781, 1782, and 1783 made of a conductive material (e.g., a metal). In an example where the beam 710 and the curved extension are completely conductive (e.g., metal), the contacts 1677-1674 and 1781-1783 may be eliminated. The actuators (e.g., the fringing field actuators and the actuator 1650) are not shown in FIGS. 19A-19C.

In some examples, the curved surface 1901 of the extension 738 may be formed by an etching process, in which a grey scale mask can be used to controllably vary a thickness of a resist, followed by etching the surface using the resist as a controllable pattern. In such an etching process, the etch rates of the material being etched and of the resist may be compatible. For example, the etch rate of material can be such that to remove it roughly half of the resist is removed, and the profile of the resist can be translated to the profile of the etched material. For example, if the resist goes from zero thickness to full thickness over a distance of 1 um, the etched material after being etched can have zero thickness to full thickness over a distance of ~0.5 um. Based on the exposure conditions for the resist and how that translates to the final thickness, a mask can be created to controllably change the slope of the etched features. There are other techniques to control the resist profile by using, for example, hard bakes and under or over exposure that can provide similar properties/benefits of the grey scale mask.

FIG. 19A shows the switch in an open configuration in which the end of the beam 710 is not touching the curved extension 738. As the fringing electric field increases, the beam bends toward the extension as described above. FIG. 19B shows the switch in a configuration in which the outer contacts 1670 and 1672 touch the extension's outer contacts 1781 and 1782 but the inner contacts 1674 and 1783 have not yet touched due to the curved nature of the extension 738. The contact between the outer pairs of contacts increases the stiffness laterally across the beam as described above.

In FIG. 19C, the voltage increases to a level at which the electric field due to the actuator 1650 (not shown) is large enough to cause the beam 710 to bow along its longitudinal axis. The contact force on all three pairs of contacts (1670/1781, 1674/1783, and 1672/1782) is large enough to cause the contacts to weld together thereby creating a low resistance current path through the relay. The beam's radius of curvature matches the extension's radius of curvature.

Figure 20A:
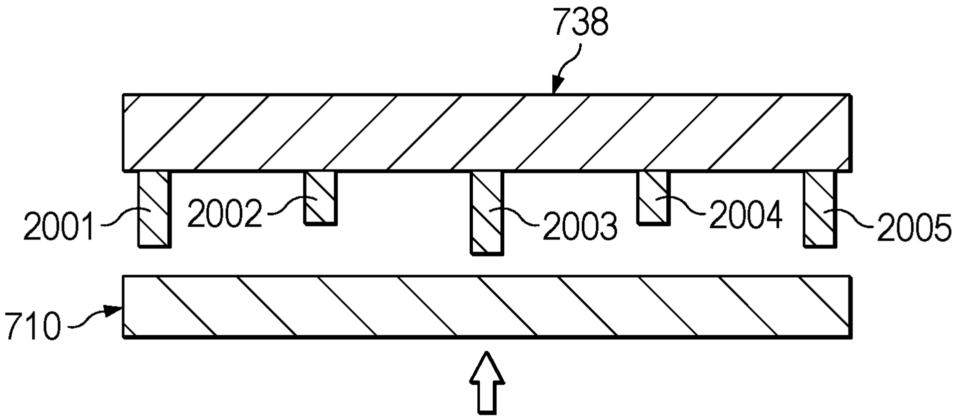
FIGS. 20A and 20B are schematics illustrating example operations of the electromechanical switch of FIG. 16.
Figure 20B:
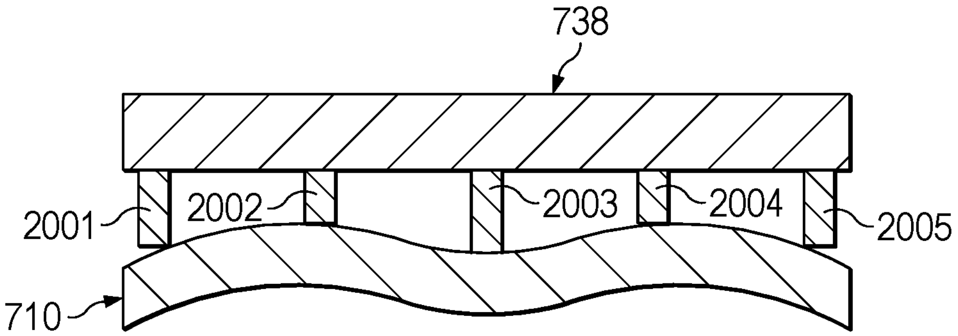

In some examples, electromechanical switch 700 can include additional protrusion structures to define additional curvatures, which can cause beam end 710*b* to bend around multiple axes that are orthogonal to axis 1502. FIG. 20A and FIG. 20B are schematics that illustrate examples of extension 738 and beam 710 that support multi-axial bending. In FIG. 20A, the extension includes two sets of protrusion structures. One set of protrusion structures includes protrusions 2001, 2003, and 2005, and the other set of protrusion structures includes protrusions 2002 and 2004. Protrusion structures 2001, 2003, and 2005 are taller than protrusion structures 2002 and 2004. As the voltage on the actuators increases, the beam 710 bends towards the extension, and the straight beam surface first touches protrusion structures 2001, 2003, and 2005 but not protrusion structures 2002 and 2004 due to the greater height of protrusion structures 2001, 2003, and 2005. As the voltage continues to increase, the electric field created by actuator 1650 (not shown) causes the beam 710 to bend laterally as shown in FIG. 20B. The curvature of the beam approximates a sinusoidal shape due to the varying heights between protrusion structures 2001, 2003, and 2005 and protrusion structures 2002 and 2004.

Figure 21:
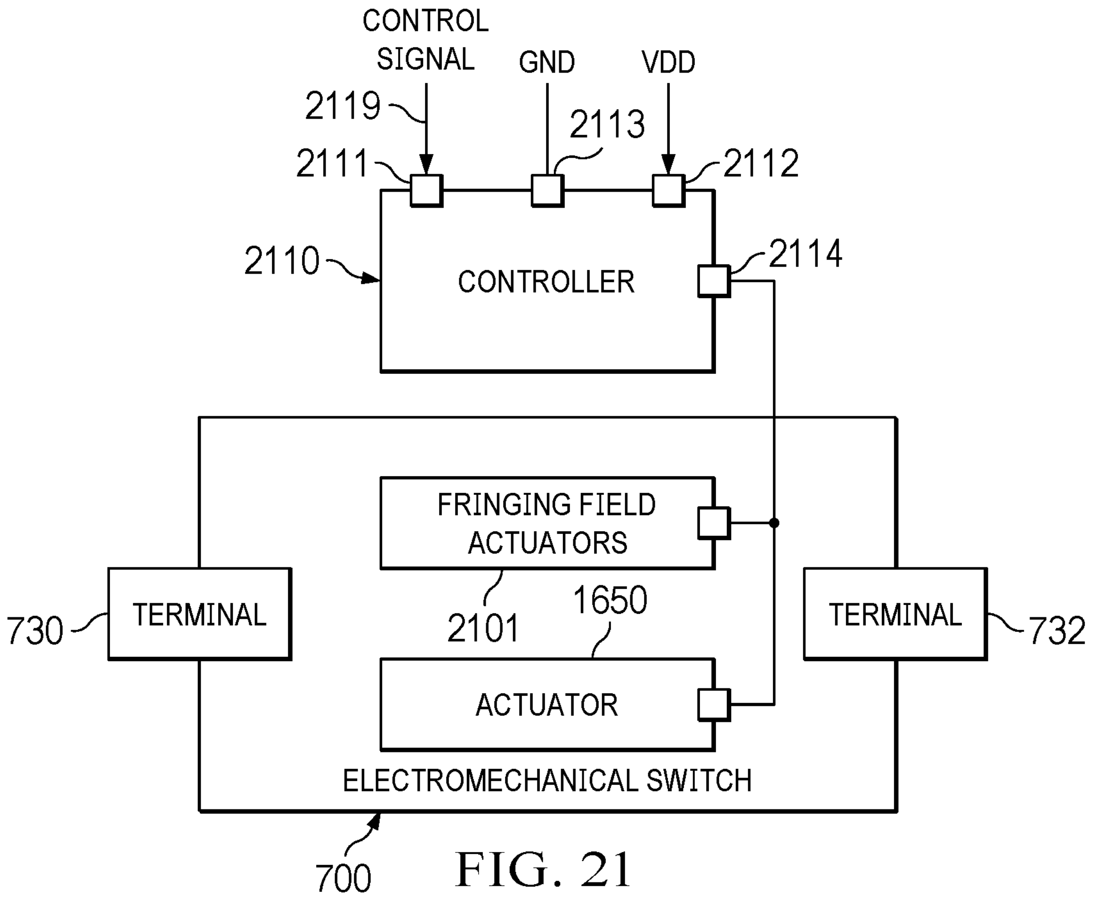
FIG. 21 and FIG. 22 are schematics illustrating an example system including an electromechanical switch.
Figure 22:
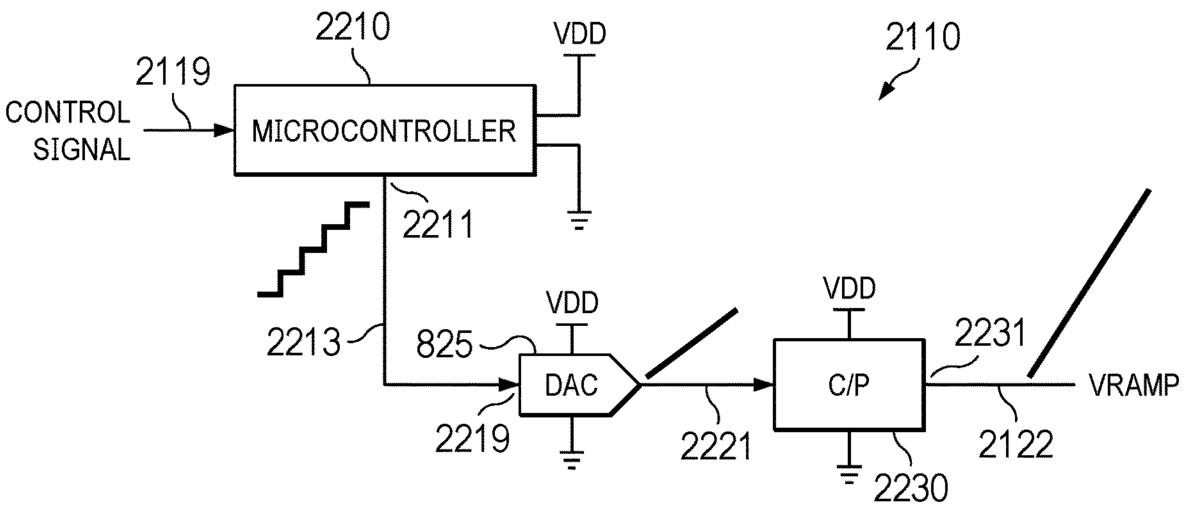

FIG. 21 illustrates a schematic of a system including electromechanical switch 700. The electromechanical switch 700 includes fringing field actuators 2101 (examples of which can include fringing field actuators 740 and 742 of FIG. 7, 802 of FIGS. 8, 900 and 910 of FIG. 9, 1020 of FIG. 10, and 1130 of FIG. 11), actuator 1650, and electrical contacts 721 and 722. The electromechanical switch 700 may be coupled to or include (e.g., in the same device package) a controller 2110. Example internal components of controller 2110 is shown in FIG. 22 and described below. The controller 2110 includes terminals 2111-2114. Terminal 2111 is an input to which a control signal 2119 is applied. Terminal 2114 is an output at which a ramp voltage VRAMP 2122 is generated. Terminals 2112 and 2113 are power terminals to which a supply voltage (VDD) and ground, respectively, are coupled. The controller 2110 produces the ramp voltage VRAMP 2222 at terminal 2114 in response to a logic state of the control signal 2119 indicating that the electromechanical switch 700 is to be closed.

In this example, terminal 2114 of the controller 2110, which provides the ramp voltage 2222, is coupled to both the fringing field actuators 2101 and the actuator 1650. In another embodiment, the controller 2110 has separate outputs, with one of the outputs coupled to the fringing field actuators 2101, and the other output coupled to the actuator 1650. Two separate ramp voltages are generated by the controller 2110 in this latter embodiment with the voltage increasing to the fringing field actuators before the voltage begins to increase to the plate actuator.

FIG. 22 is a schematic illustrating example internal components of controller 2110. In this example, controller 2110 includes a microcontroller 2210, a digital-to-analog converter (DAC) 2220, and a charge pump (C/P) 2230. The microcontroller 2210 may include memory, or may be coupled to memory, that stores instructions executable by the microcontroller. The microcontroller 2210 has an input that receives the control signal 2119 and has a digital output 2213 coupled to a digital input 2219 of the DAC 2220. Upon executing the instructions, the microcontroller 2210 responds to an assertion of the control signal 2119 (to close the electromechanical switch) by generating an output digital ramp signal 2213 (e.g., a digital signal that increases in a stairstep fashion from a lower voltage to a higher voltage).

The DAC 2220 receives and converts the digital ramp signal 2213 to an analog ramp signal 2221, which is provided to an input of the charge pump 2230. The charge pump 2230 amplifies the analog ramp signal 2221 to produce the ramp voltage VRAMP 2122 at its output 2231. In one example, the analog ramp signal 2221 may approximately linearly increase from 0 V to 5V, and the corresponding ramp voltage VRAMP 2122 approximately linearly increases from 0 V to 100 V. The output 2231 of the charge pump 2230 in FIG. 2 is the terminal 2114 of the controller 2110 in FIG. 21.

Figure 23:
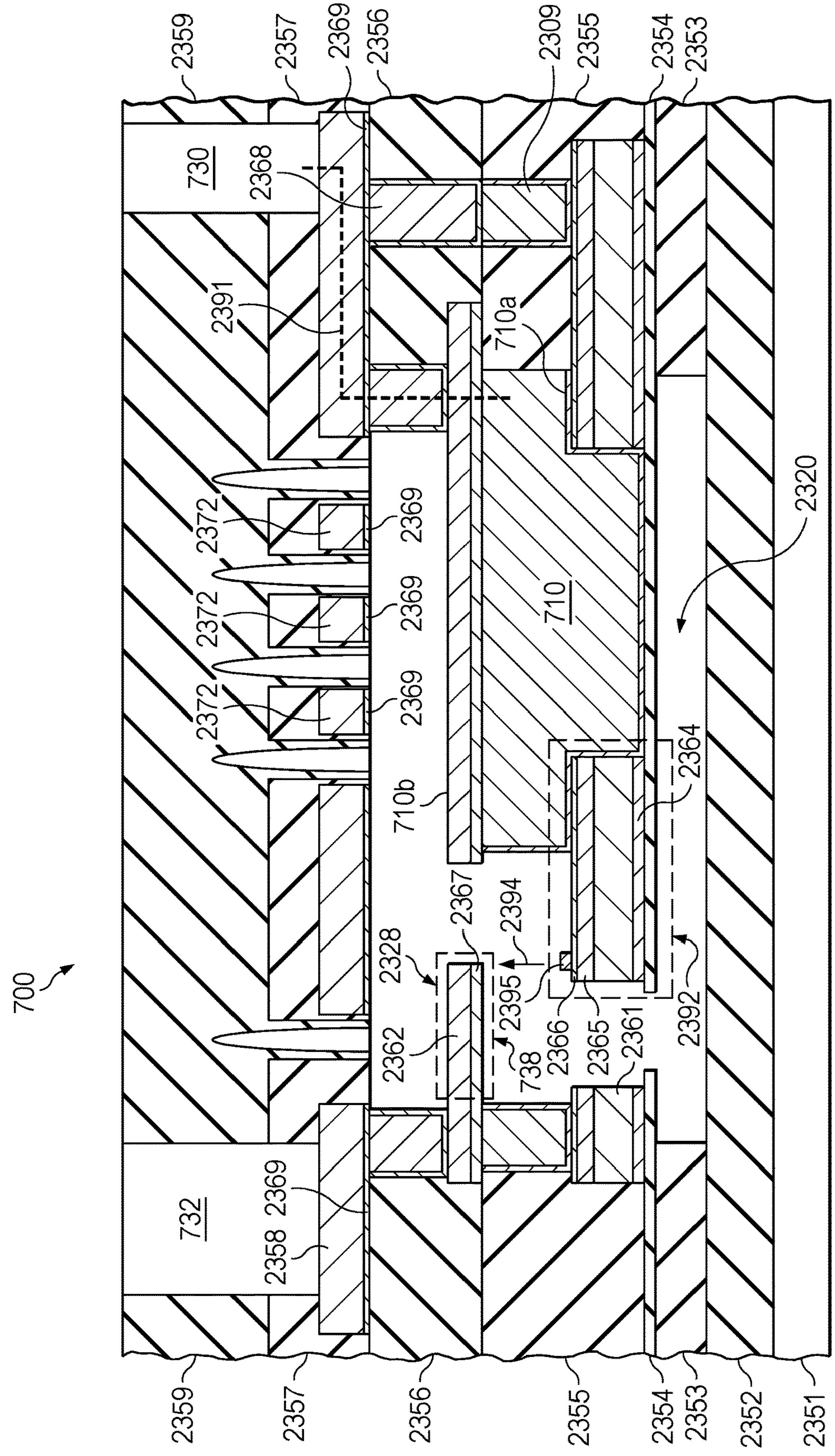
FIGS. 23-27 are schematics illustrating cross-sectional views of an example electromechanical switch.

FIG. 23 is a cross-sectional view of an example of electromechanical switch 700. The cross section shown in FIG. 23 is taken along an axis parallel to the longitudinal axis of the switch along one side of the switch. The example electromechanical switch 700 of FIG. 23 includes a semiconductor structure 2315 in which a cavity 2320 is formed. The semiconductor structure 2315 includes layers 2351-2356 formed in accordance with suitable processing techniques (e.g., deposition, etching, etc.). In this example, layer 2351 is silicon. Layer 2352 is a dielectric (e.g., $SiO_2$). Layer 2353 is silicon nitride (SiN). Layer 2354 is another dielectric layer (e.g., aluminum oxide, $Al_2O_3$, AlN, $SiO_2$, AlSiOx. Layers 2355 and 2356 are dielectric layers formed from, for example, silicon nitride. Each of the aforementioned layers 2351-2356 may be made from other suitable materials. As the various layers 2353-2356 are formed, such layers are etched to form the cavity 2320. In this example the dielectric that is used to create the cavity is Silicon Nitride (SiN). SiN can be etched in a near isotropic feature to undercut features. In some examples, a plasma CF4+O2 plasma can be used to etch SiN. Other processes can also be used. In some examples, the dielectric can be Silicon Dioxide ($SiO_2$), and a hydrogen fluoride (HF) agent, which can be in liquid form (may be buffered or otherwise selected) or in vapor form, can be used to etch $SiO_2$.

Other materials can be chosen such as polymer, metals, poly-Silicon or others can be used for layers 2353-2356. In some examples, some of the cavity creating materials may remain after the etching. In some examples, all of the cavity creating materials may be removed except in the cavity region. In the example shown in FIG. 23, the cavity creating materials remain outside of the cavity. This is appropriate for many clean dielectrics. Polymer dielectrics sometimes are not preferred if the polymers can outgas creating polymer dielectrics above the desired ohmic contacts.

During the process steps of forming the semiconductor structure 2315, additional layers are formed as well. For example, a stack of layers 2364, 2361, 2365, and 2366 are formed on top of layer 2354. Layer 2364 may be titanium aluminum (TiAl). The electromechanical switch 700 includes three metal layers-metal layer MET1 2361, metal layer MET2 2362, and metal layer MET3 2358. Metal layers MET1 2361 and MET3 2358 may be aluminum (Al) or another suitable metal. The metal layers can include adhesion and diffusion layers such as Ti, TiAl, Ta, TaN, TiW dopants such as Cu, Si and others. Metal layer MET1 2361 is formed on top of layer 2364 in this example. In this example, layer 2365 is titanium aluminum nitride (TiAlN) and is formed on top of metal layer MET1 2361. Layer 2366 is iridium (Ir) and is formed on top of layer 2365. Notice in this example the switch ohmic contact layers are Ir touching Ir. Many other materials mostly noble metals or conductive materials can be used. For example, noble metals include Ir. Pt. Rh, Ru, Au, Ag, Re. Some of the conductive oxides that might be used include IrOx, RuO2, ZnO, InOx plus many other. The switch metals can either be the same or different.

The electromechanical switch 700 also includes an electrically conductive layer 2309 of tungsten (W) in which a beam 710 is formed. Alternatives to tungsten include high melting temperature materials like Ti. Ta. Nb, Zr, Hf or Si (single crystal or polycrystalline). The beam is ideally created using high melting temperature material in order to have a low creep resistance. The tungsten typically has a thin diffusion barrier layer such as TiW, CoW, NiW, Ni, Co, TiN, Ti, Ta, TaN, or TiAl or TiAlN. The barrier layer can reduce reaction with W and/or help as an adhesion layer. Layer 2367 may be made from Iridium or another suitable conductive material. Metal layer MET2 2362 is formed on top of layer 2367. Layer 2368 is another layer formed from tungsten. Metal layer MET3 2358 covers the cavity 2320. The cavity 2320 is sealed with protective oxide (PO) dielectric layers 2357 (e.g., SION, SiN, AlN or $SiO_2$) and 2359 (e.g., SiN). Layers 2358 and 2359 are etched to provide access to metal layer MET3 2358 for the switch's terminals 730 and 732.

Beam 710 has opposing ends 710*a* and 710*b*. End 710*a* is fixed in place at the righthand side of the switch and is in electrical contact with electrical terminal 732 (as indicated by dashed line 2391) through layer 2367, metal layer MET2 2362, layer 2368, layer 2369, and metal layer MET3 2358. From end 710*a*, the beam 710 extends into cavity 1820. Reference numeral 2392 identifies a portion of layers 2354, 2364, 2361, and 2366 at end 710*b* of beam 710 that forms one of the contacts on the beam. In examples in which protrusion structures 1660 and 1662 are included, those protrusion structures are formed on layer 2366 over the contacts. Reference numeral 2395 identifies one of the protrusion structures. The extension 738 described includes a portion of layers 2367 and 2362 as identified. Under the forces caused by the actuators, the beam 710 bends upward in the direction of arrow 2394 towards extension 2393.

Figure 24:
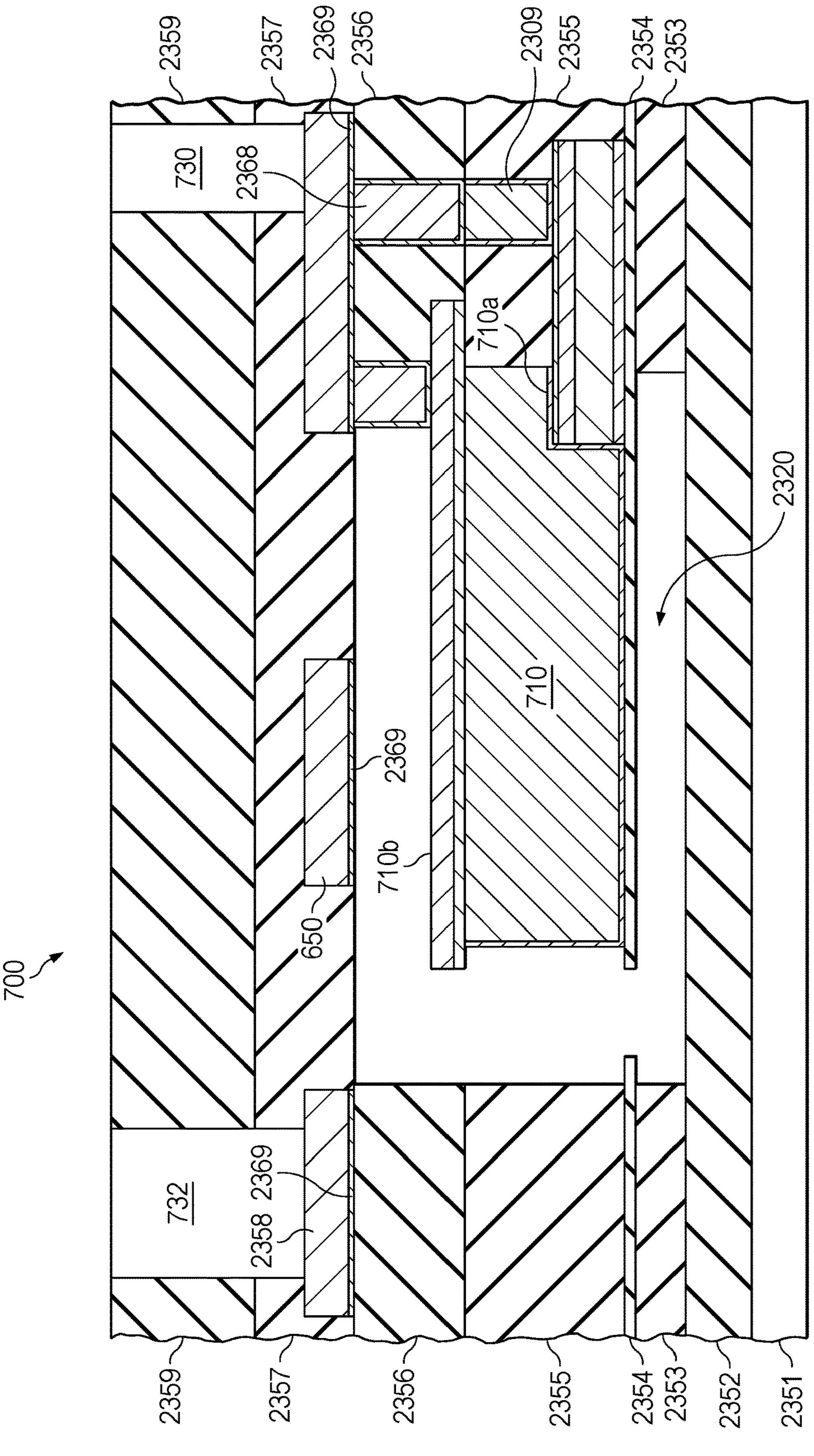

FIG. 24 shows another cross-sectional view of the electromechanical switch 700 along the central longitudinal axis of the switch. In this view, actuator 650 is shown formed within metal layer MET3 1858.

Figure 25:
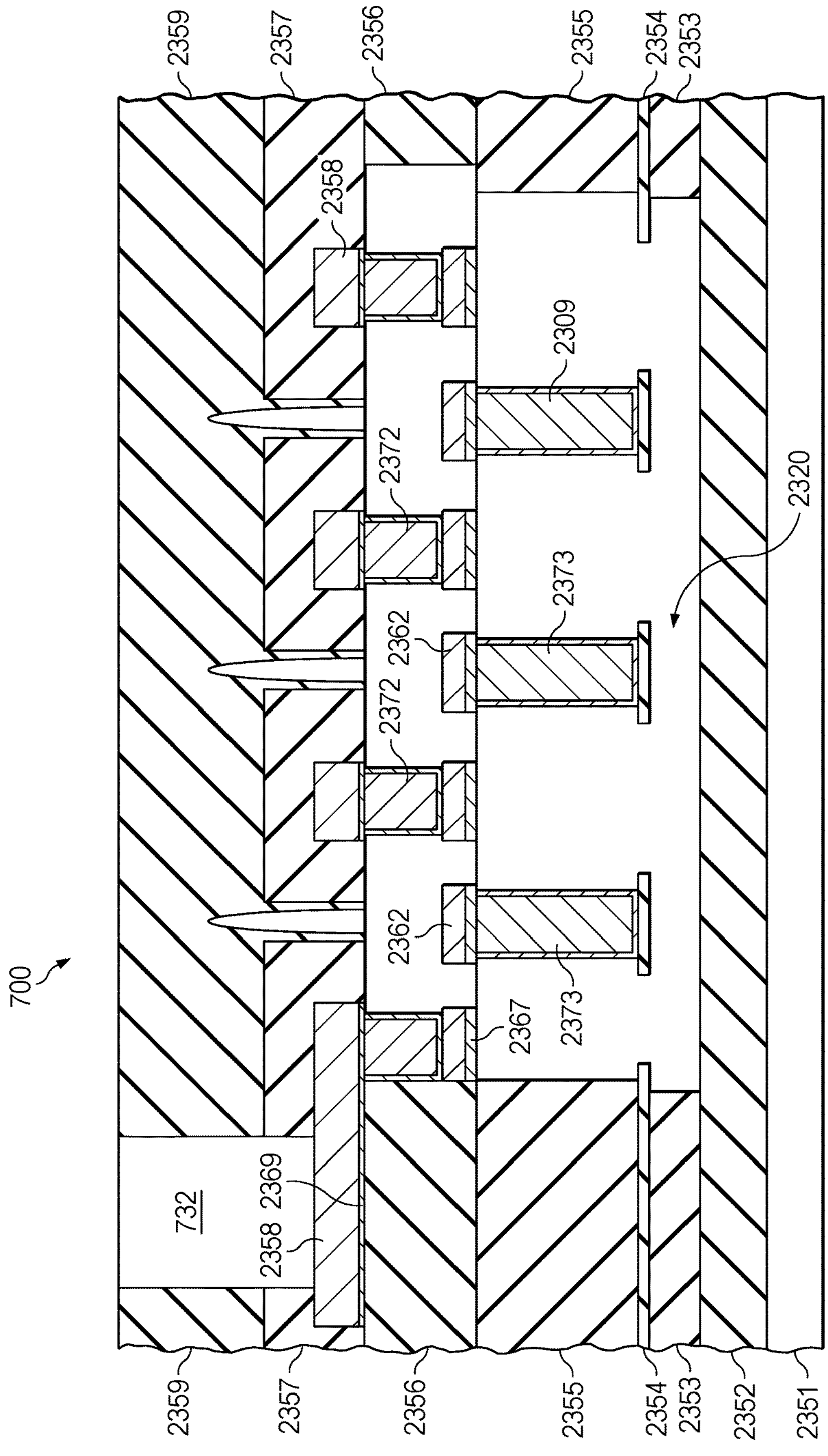

FIG. 25 is a cross-sectional view of the electromechanical switch 700 along a cut line through a comb drive (e.g., comb drive 900 or 910) along one side of the beam 710. The beam is not shown in this view, but conductive comb extensions 2373 (equivalent to comb structures 602 shown in FIGS. 6A and 6B) are shown in relation to conductive comb extensions 2372 (equivalent to comb structures 604 shown in FIGS. 6A and 6B) when the beam 710 is bent upward to make contact with extension 738 under the influence of both the fringing electric field and the electric field of the actuator 650. The conductive comb extensions 2373 from the sides of the beam 710 are formed in the same layer 2309 as the beam itself.

Figure 26:
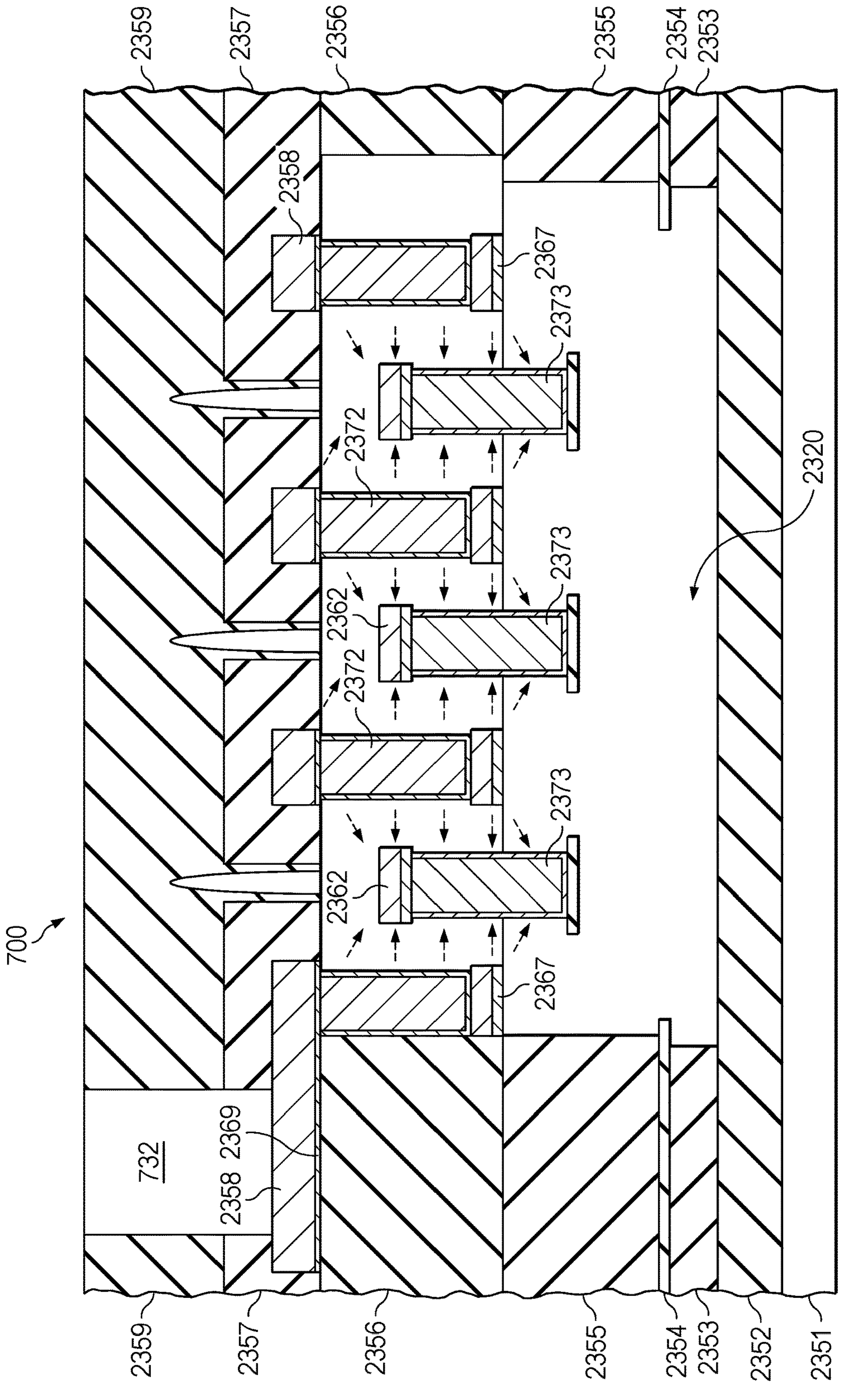

The view of FIG. 26 is the same as that of FIG. 25 except that the beam 710 has been bent toward extension 738. In this view, the conductive comb extensions of the beam 710 move into the spaces between the conductive comb extensions 2372 of the comb drive.

Figure 27:
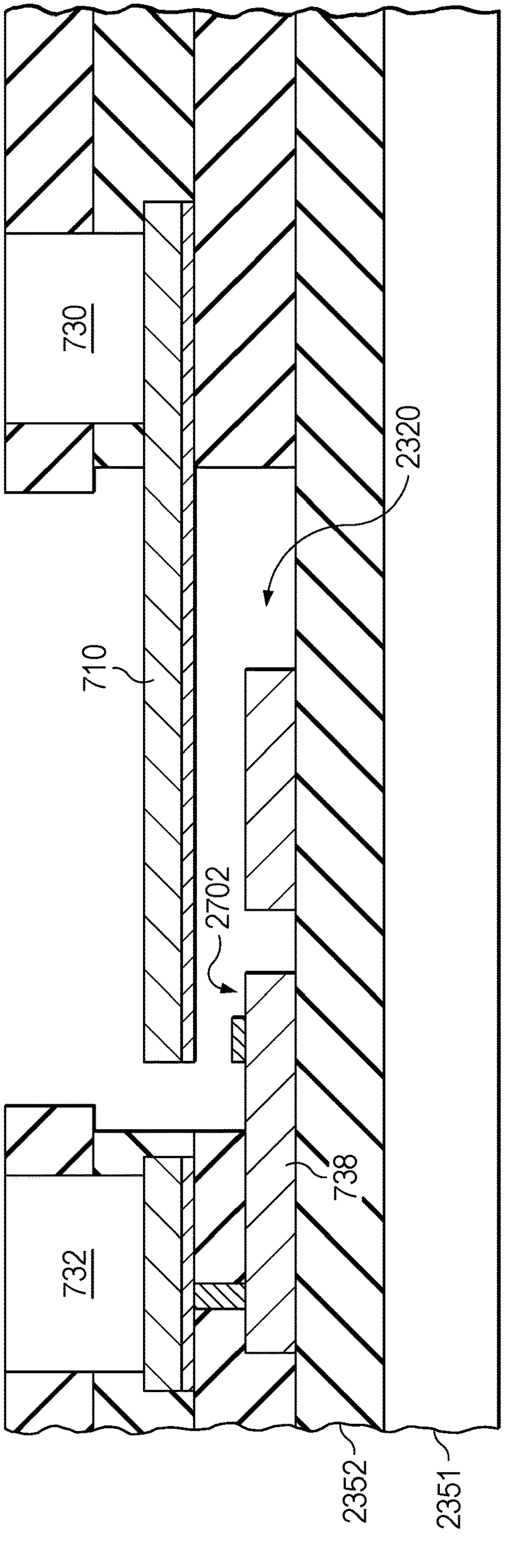

FIG. 27 is an example of electromechanical switch 700 in which beam 710 bends downward (in direction of arrow 2702) into the cavity towards the extension 738. In this example, extension 738 and beam 710 are formed in separate metal layers with the metal layer of extension 738 being below (towards the bottom of the cavity 230) the metal layer of beam 710.

The devices described herein may be inside a sealed package or alternatively in a wafer scale package. The metal pads may be connected using a bump process or alternatively wire bonds to the electrical package.

Figure 28:
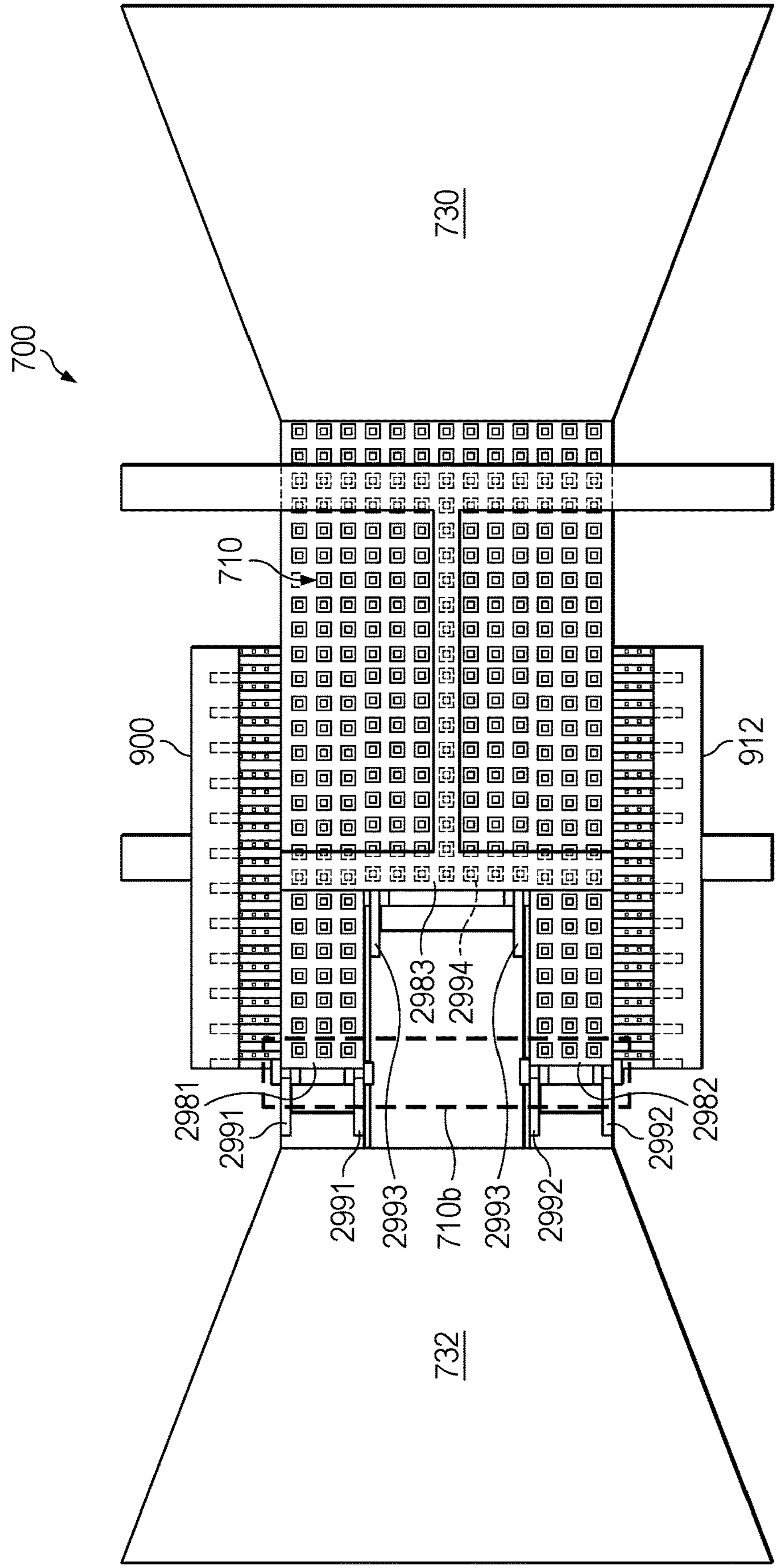
FIGS. 28 and 29 are schematics illustrating top-down views of an example electromechanical switch.
Figure 29:
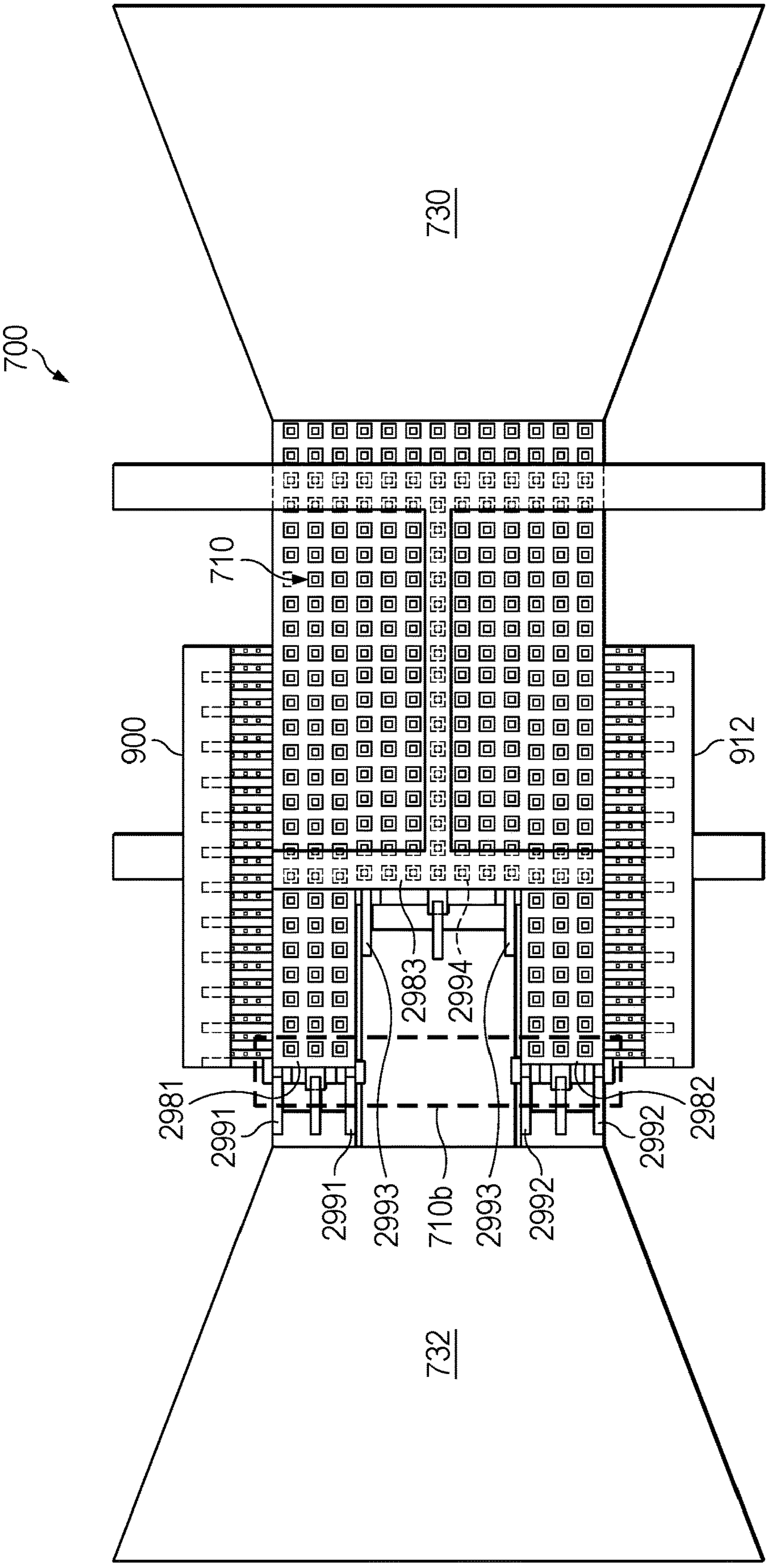

FIG. 28 and FIG. 29 are schematics illustrating top-down view of examples of electromechanical switch 700. Comb drives 900 and 912 are shown on the sides of the beam 710. In the example of FIG. 28, the end 710*b* of beam 710 has a notch formed in it thereby causing the end 710*b* to generally have a square 'C-shape' formed by sides 2981, 2982, and 2983 of beam 710. Sides 2981 and 2982 are generally coplanar while side 2983 is parallel to, but not coplanar with, sides 2981 and 2982. Side 2981 has a pair of contacts 2991. Side 2982 also has a pair of contacts 2992. Further, side 2983 has a pair of contacts 2993. Protrusion structures (not shown) may be formed on the outer pairs of contacts 2991 and 2992, while the inner pair of contacts may not have protrusion structures. In other examples (and as described above), the extension to which the beam contacts may be curved thereby avoiding the need for protrusion structures. At the edge of this beam is the fringe field electrodes and near the center is the parallel plate electrodes. The beam has holes to enable undercut over some or all of the entire beam region. The holes are not present at both ends of beam 710 facing terminals 730 and 732 and hence these regions are not undercut. Notice that the contacts 2992 and 2991 at the end of the beam can come into physical contact first (e.g., in the first phase of the close state as shown in FIG. 17B), followed by other contacts 2993 (e.g., in the second phase of the close state as shown in FIG. 17C), which can further increase the stiffness of the beam as explained above. FIG. 28 and FIG. 29 also illustrate a planar actuation electrode 2994 which can be planar conductor 760. The stiffness can be further increased when the planar actuation electrode 2994 near the middle contacts 2993 is actuated, which also increases the contact force for middle contacts 2993. The increased contact force enables formation of an ohmic welded contact, while the increased stiffness can facilitate subsequent release of the electromechanical contact when the electrostatic force is reduced or withdrawn, as explained above. This weld region can have a width between 1 nm to 10 nm for softer materials such as Gold (Au) or Silver (Ag). In some examples, a weld region can have a width of 100 nm if enough contact force is provided.

The electromechanical switch 700 of FIG. 29 is similar to the electromechanical switch 700 of FIG. 28. In FIG. 29, each of sides 2981-2983 forming the C-shaped end 710*b* of the beam 710 has three contacts rather than two contacts as was the case for the example of FIG. 28. In FIG. 29, side 2981 has three contacts 2991, side 2982 has three contacts 2992, and side 2983 has three contacts 2993. The number of contacts may vary from what is shown in FIGS. 28 and 29. More contacts reduce the force per contact since the overall force is roughly constant. More contact points can be beneficial from an overall resistance standpoint and potentially a reliability standpoint from a weld separation standpoint. The placement of the contacts also enables multi-axial bending of the beam, which can lead to higher stiffness when the beam bends and more contact force. Each contact is at a different location and height if dimples are used, and multi-axial bending can be achieved using parallel plate and fringing fields.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

Modifications are possible in the described embodiments, and other embodiments are possible, within the scope of the claims.

What is claimed is:

1. An apparatus, comprising:
- a structure having a cavity, and first and second cavity sides on opposite sides of the cavity;
- a first electrical terminal on the first cavity side of the structure;
- a second electrical terminal on the second cavity side of the structure, and the second electrical terminal including an extension that includes a first electrical contact;
- a beam extending from the first cavity side and bendable around more than one axis, the beam including:
  - a metal layer electrically coupled to the first electrical terminal;
  - opposite first and second beam sides, in which the first beam side is coupled to the first electrical terminal; and
  - a second electrical contact on the second beam side and electrically coupled to the metal layer, in which the second electrical contact overlaps at least a portion of the extension and faces the first electrical contact; and
- an actuator configurable to bend the beam around a first axis, and configurable to bend the beam around a second axis different from the first axis by moving the second beam side towards the extension.

2. The apparatus of claim 1,
- wherein the apparatus further includes first and second protrusion structures between the extension and the beam; and wherein the second beam side are in contact with the first and second protrusion structures and with part of the extension when the beam bends.

3. The apparatus of claim 2, wherein the first and second protrusion structures are part of the extension facing the beam.

4. The apparatus of claim 2, wherein the first and second protrusion structures are part of the beam facing the extension.

5. The apparatus of claim 2, further comprising a third protrusion structure between the first and second protrusion structures, the third protrusion structure having a shorter height than the first and second protrusion structures, and the second beam side are in contact with the first, second, and third protrusion structures when the beam bends around the second axis.

6. The apparatus of claim 2, wherein the second electrical contact is between the first and second protrusion structures.

7. The apparatus of claim 6, wherein the beam includes a third electrical contact and a fourth electrical contact on the second beam side, the second electrical contact being between the third and fourth electrical contacts; and wherein the first protrusion structure overlaps with the third electrical contact, the second protrusion structure overlaps with the fourth electrical contact, and the first and second protrusion structures are metallic.

8. The apparatus of claim 1, wherein the extension includes a curved surface facing the second beam side; and wherein the beam bends around the second axis when the second beam side is in physical contact with at least part of the curved surface.

9. The apparatus of claim 1, wherein the actuator is configured to bend the beam around a third axis parallel to the second axis by moving the second beam side against the extension.

10. The apparatus of claim 9, wherein the beam includes opposing third and fourth beam sides;

wherein the apparatus further includes first, second, third, and fourth protrusion structures on the second beam side between the extension and the beam, the first protrusion structure proximate the third beam side, the second protrusion structure proximate the fourth beam side, and the third and fourth protrusion structures are between the first and second protrusion structures; and wherein the second beam side are in physical contact with the first, second, third, and fourth protrusion structures, a first part of the extension between the first and third protrusion structures, a second part of the extension between the third and fourth protrusion structures, and a third part of the extension between the fourth and second protrusion structures, when the beam bends around the second axis and the third axis.

11. The apparatus of claim 1, wherein the actuator includes a fringing field actuator.

12. The apparatus of claim 11, wherein the fringing field actuator includes a comb drive.

13. The apparatus of claim 11, wherein the fringing field actuator is in a periphery of the beam.

14. The apparatus of claim 11, wherein the beam includes an opening, and the fringing field actuator overlaps the opening of the beam.

15. The apparatus of claim 1, wherein the actuator includes a planar conductor overlapping the beam.

16. The apparatus of claim 1, wherein the actuator is a first actuator, the first actuator including a fringing field actuator; and wherein the apparatus further comprises a second actuator, the second actuator including a planar conductor overlapping the beam.

17. The apparatus of claim 1, further comprising a controller having a voltage ramp circuit output coupled to the actuator, wherein the controller is configured to generate a voltage ramp at the voltage ramp circuit output.

18. The apparatus of claim 17, wherein the beam includes an actuator portion insulated from the metal layer; and wherein the voltage ramp circuit output is coupled to the actuator portion of the beam.

19. The apparatus of claim 1, wherein the beam includes a first set of parallel metal segments and a second set of parallel metal segments, the parallel metal segments within each set are spaced apart, and the first and second set of parallel metal segments are orthogonal to each other.

20. The apparatus of claim 19, wherein at least some parallel metal segments of the first set of parallel metal segments or the second set of parallel metal segments are part of the actuator.

21. The apparatus of claim 1, wherein the beam is mechanically coupled only to the first cavity side when the beam is in an unbent state.

* * * * *